United States Patent
Beaufays et al.

(10) Patent No.: US 12,014,739 B2
(45) Date of Patent: Jun. 18, 2024

(54) USING CORRECTIONS, OF AUTOMATED ASSISTANT FUNCTIONS, FOR TRAINING OF ON-DEVICE MACHINE LEARNING MODELS

(71) Applicant: GOOGLE LLC, Mountain View, CA (US)

(72) Inventors: Françoise Beaufays, Mountain View, CA (US); Rajiv Mathews, Sunnyvale, CA (US); Dragan Zivkovic, Sunnyvale, CA (US); Kurt Partridge, San Francisco, CA (US); Andrew Hard, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/218,818

(22) Filed: Jul. 6, 2023

(65) Prior Publication Data
US 2023/0352019 A1    Nov. 2, 2023

Related U.S. Application Data

(63) Continuation of application No. 16/973,572, filed as application No. PCT/US2019/060537 on Nov. 8, 2019, now Pat. No. 11,741,953.

(51) Int. Cl.
*G10L 15/22* (2006.01)
*G10L 15/065* (2013.01)
(Continued)

(52) U.S. Cl.
CPC ............ *G10L 15/22* (2013.01); *G10L 15/065* (2013.01); *G10L 15/10* (2013.01); *G10L 15/30* (2013.01)

(58) Field of Classification Search
USPC ..................................... 704/1–504
See application file for complete search history.

(56) References Cited

U.S. PATENT DOCUMENTS 10,152,298 B1 * 12/2018 Salvador ................. G06F 3/167
11,080,336 B2 *  8/2021 Van Dusen ............ G06Q 10/10
(Continued)

FOREIGN PATENT DOCUMENTS

AU    2020466345 A1 * 11/2022    ............ G10L 15/063
AU    2020472583 B2 * 10/2023    ............ G06F 3/167
(Continued)

OTHER PUBLICATIONS

European Patent Office; Communication issued in Application No. 23193113.0; 12 pages; dated Nov. 9, 2023.
(Continued)

*Primary Examiner* — Marcus T Riley
(74) *Attorney, Agent, or Firm* — Gray Ice Higdon

(57) ABSTRACT

Processor(s) of a client device can: receive sensor data that captures environmental attributes of an environment of the client device; process the sensor data using a machine learning model to generate a predicted output that dictates whether one or more currently dormant automated assistant functions are activated; making a decision as to whether to trigger the one or more currently dormant automated assistant functions; subsequent to making the decision, determining that the decision was incorrect; and in response to determining that the determination was incorrect, generating a gradient based on comparing the predicted output to ground truth output. In some implementations, the generated gradient is used, by processor(s) of the client device, to
(Continued)

update weights of the on-device speech recognition model. In some implementations, the generated gradient is additionally or alternatively transmitted to a remote system for use in remote updating of global weights of a global speech recognition model.

20 Claims, 9 Drawing Sheets

(51) Int. Cl.
*G10L 15/10* (2006.01)
*G10L 15/30* (2013.01)

(56) References Cited

U.S. PATENT DOCUMENTS

| | | | |
|---|---|---|---|
| 11,363,146 B2 | 6/2022 | Rico Ródenas | |
| 11,367,441 B2 | 6/2022 | Lee | |
| 11,521,604 B2 * | 12/2022 | Kracun | G10L 15/22 |
| 11,562,748 B2 * | 1/2023 | Sharifi | G10L 15/22 |
| 11,741,953 B2 * | 8/2023 | Beaufays | G10L 15/10 |
| | | | 704/201 |
| 2014/0222436 A1 * | 8/2014 | Binder | G10L 15/22 |
| | | | 704/275 |
| 2014/0365226 A1 * | 12/2014 | Sinha | G10L 15/22 |
| | | | 704/275 |
| 2017/0235848 A1 * | 8/2017 | Van Dusen | G06Q 10/101 |
| | | | 705/12 |
| 2018/0232662 A1 * | 8/2018 | Solomon | G06F 3/04842 |
| 2018/0268747 A1 * | 9/2018 | Braun | G06V 40/172 |
| 2019/0115026 A1 * | 4/2019 | Sharifi | G10L 15/08 |
| 2019/0304459 A1 * | 10/2019 | Howard | G10L 15/18 |
| 2019/0339784 A1 * | 11/2019 | Lemay | G06F 3/0346 |
| 2020/0143809 A1 * | 5/2020 | Lee | G10L 15/22 |
| 2021/0327421 A1 * | 10/2021 | Beaufays | G10L 15/10 |
| 2021/0360109 A1 * | 11/2021 | Rico Ródenas | H04M 3/5235 |
| 2022/0115011 A1 * | 4/2022 | Sharifi | G10L 15/22 |
| 2022/0172727 A1 * | 6/2022 | Sharifi | G10L 15/22 |
| 2023/0101572 A1 * | 3/2023 | Kracun | G10L 15/063 |
| | | | 704/243 |
| 2023/0352019 A1 * | 11/2023 | Beaufays | G10L 15/10 |

FOREIGN PATENT DOCUMENTS

| | | | | |
|---|---|---|---|---|
| AU | 2020466345 B2 * | 11/2023 | | G10L 15/063 |
| CN | 114651228 A * | 6/2022 | | G06F 3/167 |
| CN | 115552515 A * | 12/2022 | | G10L 15/063 |
| CN | 115699166 A * | 2/2023 | | G10L 15/08 |
| EP | 3389045 | 10/2019 | | |
| EP | 3841459 B1 * | 10/2023 | | G06F 3/167 |
| EP | 4254169 A2 * | 10/2023 | | G06F 3/167 |
| JP | 2018136568 | 8/2018 | | |
| WO | 2018212941 | 11/2018 | | |
| WO | 2019212567 | 11/2019 | | |
| WO | WO-2021091573 A1 * | 5/2021 | | G06F 3/167 |
| WO | WO-2022050973 A1 * | 3/2022 | | G10L 15/063 |
| WO | WO-2022081590 A1 * | 4/2022 | | G10L 15/08 |

OTHER PUBLICATIONS

Japanese Patent Office; Notice of Reasons for Rejection issued in Application No. 2022522685; 8 pages; dated Jun. 5, 2023.
European Patent Office; Intention to Grant issued in Application No. 19836116.4, 71 pages, dated Apr. 17, 2023.
Intellectual Property India, First Examination Report issued in Application No. 202227020773, 7 pages, dated Aug. 22, 2022.
European Patent Office; Communication pursuant to Article 94(3) issued in Application No. 19836116.4, 5 pages, dated Aug. 3, 2022.
European Patent Office; Summons to attend oral proceedings pursuant to Rule 115(1) issued in Application No. 19836116.4; 13 pages, dated May 23, 2022.
European Patent Office; Communication Pursuant to Article 94(3) EPC issued in Application No. 19836116.4; 11 pages; dated Jul. 13, 2021.
Brwonlee; A Gentle Introduction to Exploding Gradients in Neural Networks; XPO55813789; Retrieved from the Internet; https://web.archive.org/web/20180709092622/https://machinelearningmastery.com/exploding-gradients-in- neural-networks/; dated Dec. 8, 2017.
Brownlee; How to Implement the Backpropagation Algorithm from Scratch in Python; XP055813704; Retrieved from the Internet; https://web.archive.org/web/20190620054433/https://machinelearningmastery.com/implement-backpropagation-algorithm-scratch-python/; dated Nov. 7, 2016.
Eurpoean Patent Office; International Search Report and Written Opinion of PCT Ser. No. PCT/US2019/060537; 16 pages; dated Jul. 10, 2020.

* cited by examiner

USING CORRECTIONS, OF AUTOMATED ASSISTANT FUNCTIONS, FOR TRAINING OF ON-DEVICE MACHINE LEARNING MODELS

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant," "OK Assistant", and/or "Assistant". When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). However, when predicted output indicates that a hotword is not present, corresponding audio data will be discarded without any further processing, thereby conserving resources and user privacy.

Some automated assistants additionally or alternatively implement a continued conversation mode that can be enabled. When enabled, the continued conversation mode can process any spoken input that is detected via microphone(s) of a client device within a threshold amount of time of a prior spoken utterance directed to the automated assistant and/or within a threshold amount of time after the automated assistant has performed action(s) based on the prior spoken utterance. For example, a user can initially invoke the automated assistant (e.g., via hotword, a hardware or software button, etc.) and provided an initial utterance of "turn on living room lights", then shortly after provide a follow-on utterance of "turn on the kitchen lights". The follow-on utterance will be acted upon by the automated assistant when continued conversation mode is enabled, without necessitating the user again invoke the assistant.

Continued conversation mode can discriminate between follow-on utterances of a user that are intended for processing by the automated assistant and utterance(s) that are not so intended (e.g., utterances that are instead directed to another human). In doing so, audio data capturing the follow-up utterance can be processed using a machine learning model, optionally along with recognized text from the follow-up utterance and/or representation(s) thereof (e.g., natural language understanding data generated based on the recognized text). Predicted output is generated based on the processing, and indicates whether the follow-up utterance is intended for the automated assistant. Further automated assistant function(s) are activated only when the predicted output indicates the follow-up utterance is intended for the automated assistant. Otherwise, the further automated assistant function(s) are not activated, and data corresponding to the follow-up utterance is discarded. The further function(s) can include, for example, further verification that the follow-up utterance is intended for the automated assistant and/or performing action(s) based on the follow-up utterance.

The above-mentioned and/or other machine learning models (e.g., additional machine learning models described below), whose predicted output dictates whether automated assistant function(s) are activated, perform well in many situations. However, there are still occurrences of false negative determinations and false positive determinations based on the machine learning model(s).

With a false negative, the predicted output dictates that the automated assistant function(s) not be activated, despite the audio data (and/or other data), processed to generate the predicted output, being appropriate for activating those function(s). For example, assume the predicted output generated using a hotword detection model is a probability and the probability must be greater than 0.85 before the automated assistant function(s) are activated. If a spoken utterance indeed includes the hotword, but the predicted output generated based on processing audio data is only 0.82, the function(s) will not be activated and this will be considered a false negative. Occurrences of false negatives can prolong the human/automated assistant interaction, forcing the human to repeat the utterance (and/or perform other action(s)) that were initially intended to activate automated assistant functions.

With a false positive, the predicted output dictates that the automated assistant function(s) be activated, despite the audio data (and/or other sensor data), processed to generate the predicted output, being inappropriate for activating those function(s). For example, assume the predicted output generated using a hotword detection model is a probability and the probability must be greater than 0.85 before the automated assistant function(s) are activated. If a spoken utterance does not include the hotword, but the predicted output generated based on processing audio data is 0.86, the function(s) will still be activated and this will be considered a false positive. In addition to privacy concerns, occurrences of false positives can waste network and/or computational resources by needlessly activating the function(s).

SUMMARY

Some implementations disclosed herein are directed to improving performance of machine learning model(s) that are utilized in determining whether automated assistant function(s) are to be initiated. As described in more detail herein, such machine learning models can include, for example, hotword detection models, continued conversation models, hot-word free invocation models, and/or other machine learning models. Various implementations generate, at a client device, a predicted output based on processing audio data and/or other sensor data using a machine learning model stored locally at the client device. Those implementations further make a decision, based on the predicted output, as to whether to initiate one or more automated assistant function(s). For example, the decision can be based on whether the predicted output satisfies a threshold. Further, those implementations determine, locally at the client device and based on analyzing further user interface input and/or other data, whether the decision, made based on the predicted output, was correct. When it is determined that the decision was incorrect (i.e., the decision was a false negative or a false positive), those implementations generate, locally at the client device, a gradient based on comparing the predicted output to ground truth output (e.g., ground truth output that satisfies the threshold).

In some implementations, the generated gradient is used, by one or more processor(s) of the client device, to update one or more weights of the machine learning model based on the generated gradient. For example, backpropagation and/or other technique(s) can be used to update the weights based on the gradient. This can improve performance of the machine learning model stored locally at the client device, mitigating the occurrence of false negatives and/or false positives based on predicted outputs generated using the machine learning model. Moreover, this enables improved performance of the on-device machine learning model for attribute(s) of user(s) of the client device, such as tone, intonation, accent, and/or other speech characteristic(s) in the case of machine learning model(s) that process audio data capturing spoken utterances.

In some implementations, the generated gradient is additionally or alternatively transmitted, by the client device and over a network, to a remote system. In those implementations, the remote system utilizes the generated gradient, and additional gradients from additional client devices, to update global weights of a corresponding global machine learning model. The additional gradients from the additional client devices can be similarly generated, locally at the corresponding additional client devices, based on determining that corresponding decisions were incorrect. In various implementations, the client device transmits the generated gradient without transmitting any of the data (e.g., audio data and/or other sensor data) that was utilized to generate the predicted output that was determined to be incorrect, and without transmitting any of the data (e.g., further user interface input) that was utilized to determine the predicted output was incorrect. The remote system can utilize the generated gradient in updating the global model, without any reference to or use of such data. The transmitting of only the gradient utilizes less network resources than transmitting of the larger data size data used to generate the predicted output and to determine that the predicted output was incorrect. Further, transmitting of the gradient preserves privacy and security of personal data, as the data utilized in generating the predicted output and in determining that the predicted output was incorrect, is not derivable from the gradient. In some implementations, one or more differential privacy techniques (e.g., adding Gaussian noise) can be utilized to further ensure such data is not derivable from the gradient.

In implementations where the remote system updates global weights of the speech recognition model, the remote system can thereafter provide the updated global weights to client devices to cause the client devices to replace weights of their on-device machine learning models with the updated global weights. In some implementations, the remote system can additionally or alternatively provide the updated machine learning model to client devices to cause the client devices to replace their on-device machine learning models with the updated global machine learning model. On-device performance is therefore improved through utilization of the updated global weights or updated global machine learning model.

Various techniques can be utilized to determine that a decision, as to whether to initiate currently dormant automated assistant function(s), is incorrect. In many implementations, determining that the decision is incorrect can be based on further user interface input that is received at the client device subsequent to the sensor data utilized to make the decision, and that contradicts (explicitly or implicitly) the decision. In those implementations, determining that the decision is incorrect can be based on a duration of time between receiving the sensor data utilized to make the decision and receiving the further user interface input. For example, a likelihood of determining that the decision was incorrect can increase as the duration of time decreases and/or determining that the decision was incorrect can be contingent on the duration being less than a threshold. In those implementations, determining that the decision is incorrect can additionally or alternatively be based on a determined measure of similarity between the further user interface input and the sensor data utilized to make the decision (with a likelihood of determining that the decision was incorrect increasing with increasing similarity indicated by the measure of similarity). For example, the measure of similarity can be based on duration similarity based on comparison of durations of the further user interface input and the sensor data utilized to make the determination. Also, for example, when the further user interface input is an additional spoken utterance and the sensor data utilized to make the determination includes a prior spoken utterance, the measure of similarity can be based on voice similarity based on comparison of voice characteristics of the spoken utterance and the additional spoken utterance and/or text similarity based on comparison of recognized text of the spoken utterance and the additional spoken utterance.

In some implementations, determining whether the decision was incorrect can be based on a magnitude of the predicted output that was generated by the corresponding machine learning model and utilized to make the decision. In some of those implementations, the decision as to whether to initiate the currently dormant automated assistant function(s) can be dependent on whether the magnitude of the predicted output satisfies a threshold, and whether that decision is determined to be incorrect can be based on how close the predicted output is to the threshold. For example, assume the predicted output indicates a probability, and to initiate the automated assistant function(s) the probability must be greater than 0.85. In such an example, determining whether a decision to not initiate the automated assistant function(s) is incorrect can be based on how close the probability is to the threshold. For instance, the decision is more likely to be determined to be incorrect the closer the probability is to the threshold and/or can be contingent on the probability being within a certain range of the threshold. Considering the magnitude of the predicted output can prevent incorrectly determining that true negatives are false negatives and/or determining that true positives are false positives.

Some particular examples of determining whether a decision, as to whether to initiate currently dormant automated assistant function(s), is incorrect, are now provided with reference to a hotword detection model that is utilized to monitor for presence of invocation hotword(s) that, when detected, will initiate certain processing of audio data that follows within a threshold amount of time of the invocation hotword.

As an example, assume the hotword detection model is trained to generate predicted output that indicates a probability of whether the hotword "OK Assistant" is present in audio data, and that the hotword will be determined to be present if the probability is greater than 0.85. Also assume that an initial spoken utterance, captured in audio data, includes the hotword "OK Assistant", but the predicted output generated based on processing the audio data indicates a probability of only 0.8. Further assume that a subsequent spoken utterance, captured in additional audio data, is received 2.0 seconds after the initial spoken utterance (e.g., after completion of the initial spoken utterance), includes the hotword "OK Assistant", and the predicted output generated based on processing the additional audio data indicates a probability of 0.9. Thus, in the example, the user initially spoke "OK Assistant" to invoke the assistant, it wasn't recognized as an invoking hotword, and the user quickly followed up with another instance of "OK Assistant" to again attempt to invoke the assistant—and the follow-up instance was recognized as an invoking hotword. In the example, an initial decision will be made, based on 0.8 being less than 0.85, to not initiate the certain processing of audio data responsive to the initial spoken utterance. However, a subsequent decision will be made, based on 0.9 being greater than 0.85, to initiate the certain processing of audio data responsive to the subsequent spoken utterance. Further, in the example it can be determined that the initial decision was incorrect. This can be based on the further user interface input (i.e., the subsequent spoken utterance) satisfying the threshold, can be based on the probability (0.8) for the initial spoken utterance, the time duration (2.0 seconds) between receiving the initial spoken utterance and the subsequent spoken utterance (that contradicted the first by satisfying the threshold), and/or can be based on determining that the initial spoken utterance and the subsequent spoken utterance are likely from the same user (e.g., using speaker identification). For instance, determining that the prior decision was incorrect can be contingent on the time duration being less than a threshold duration (e.g., 4.0 seconds or other threshold duration) and/or contingent on the probability for the initial decision being within a range (e.g. within 0.35 or other range) of the 0.85 threshold. In other words, in such an instance, an incorrect decision will only be determined when the time duration is less than a threshold duration and the probability is within a threshold range of the 0.85 threshold.

Also, for instance, determining that the prior decision was incorrect can additionally or alternatively be a function of the time duration and the probability for the initial decision, optionally without also necessarily being contingent on either satisfying an individual threshold. For instance, a difference between the probability and the 0.85 threshold can be determined and multiplied by a factor that is based on the time duration, and the resulting value compared to a threshold in determining whether the decision was incorrect. For instance, the resulting value can indicate a correction if it is less than 0.25 and the factor based on the time duration can be a factor of 0.5 if the time duration is from 0.0 to 1.5 seconds, 0.6 if the time duration is from 1.5 seconds to 3.0 seconds, 1.0 if the time duration is from 3.0 seconds to 6.0 seconds, and 8.0 if the time duration is greater than 6.0 seconds. Thus, in the situation of the example the difference (0.05) can be multiplied by 0.6 (the factor corresponding to 2.0 second duration) to determine the value of 0.03, which is less than 0.25. Compare this to an alternative example with the same difference (0.05) but a time duration of 7.0 seconds. In such an alternative example, the value of 0.4 will be determined (0.05*8.0), which is not less than 0.25. Compare this to an additional alternative example with a larger difference (0.5), but the same time duration of 2.0 seconds. In such an alternative example, the value of 0.3 will be determined (0.5*0.6), which is not less than 0.25. Accordingly, through consideration of the time duration, the magnitude, and/or other considerations, occurrences of incorrectly determining a false negative can be mitigated. For example, considering the time duration can ensure that the subsequent utterance is indeed meant as another attempt of the prior utterance. Also, for example, considering the magnitude can ensure that the prior utterance may have indeed been a hotword, and not just another non-hotword utterance that happened to precede the subsequent utterance. As yet another example, that the prior utterance and the subsequent utterance are likely from the same person can ensure that the subsequent utterance is indeed meant as another attempt of the prior utterance. Determining the utterances are likely from the same person can be based on speaker identification techniques and/or based on comparing voice characteristic(s) (e.g., tone, intonation, and cadence) of the two utterances.

As another example, assume again that the hotword detection model is trained to generate predicted output that indicates a probability of whether the hotword "OK Assistant" is present in audio data, and that the hotword will be determined to be present if the probability is greater than 0.85. Also assume again that an initial spoken utterance, captured in audio data, includes the hotword "OK Assistant", but the predicted output generated based on processing the audio data indicates a probability of only 0.8. Further assume that further user interface input is received 1.5 seconds after the initial spoken utterance, and that the further user interface input is an alternate invocation of the automated assistant such as actuation of an explicit automated assistant invocation button (e.g., a hardware button or software button), a sensed "squeeze" of a device (e.g., when squeezing the device with at least a threshold amount of force invokes the automated assistant), or other explicit automated assistant invocation. Thus, in the example, the user initially spoke "OK Assistant" to invoke the assistant, it wasn't recognized as an invoking hotword, and the user quickly followed up with invoking the assistant in an alternative manner. In the example, an initial decision will be made, based on 0.8 being less than 0.85, to not initiate the certain processing of audio data responsive to the initial spoken utterance. However, the certain processing of audio data will be initiated responsive to the subsequent alternative invocation. Further, in the example it can be determined that the initial decision was incorrect. This can be based on the further user interface input (i.e., the subsequent alternative invocation) actually invoking the assistant, can be based on the probability (0.8) for the initial spoken utterance and/or the time duration (2.0 seconds) between receiving the initial spoken utterance and the subsequent further user interface input (that contradicted the first by satisfying the threshold).

Although examples are provided above of hotword detection models that monitor for presence of "invocation" hotwords that will lead to certain processing of audio data that follows within a threshold amount of time of the invocation hotword, it is understood that techniques disclosed herein can additionally or alternatively apply to other hotword detection models that, at least under certain conditions, can be used to monitor for word(s) (inclusive of multi-word phrases) that, if determined present, will directly result in corresponding action(s) being performed.

For example, assume a hotword detection model is provided that is trained to generate predicted output that indicates a probability of whether certain hotword(s) such as "stop" and/or "halt" are present in audio data, and that the hotword will be determined to be present if the probability is greater than 0.85. Further assume that the hotword detection model is active under certain conditions such as an alarm sounding and/or music playing and that, if the predicted output indicates the hotword(s) are present, an automated assistant function of stopping any current rendering of audio output will be initiated. In other words, such a hotword detection model enables the user to simply speak "stop" to cause a sounding alarm and/or playing music to be halted. Also assume that an initial spoken utterance, captured in audio data, includes the hotword "stop", but the predicted output generated based on processing the audio data indicates a probability of only 0.8. Further assume that a subsequent spoken utterance, captured in additional audio data, is received 0.5 seconds after the initial spoken utterance (e.g., after completion of the initial spoken utterance), includes the hotword "stop", and the predicted output generated based on processing the additional audio data indicates a probability of 0.9. In the example it can be determined that the initial decision was incorrect. This can be based on the further user interface input (i.e., the subsequent spoken utterance) satisfying the threshold, can be based on the probability (0.8) for the initial spoken utterance, the time duration (0.5 seconds) between receiving the initial spoken utterance and the subsequent spoken utterance (that contradicted the first by satisfying the threshold), and/or can be based on determining that the initial spoken utterance and the subsequent spoken utterance are likely from the same user (e.g., using speaker identification).

Some particular examples of determining whether a decision, as to whether to initiate currently dormant automated assistant function(s), is incorrect, are now provided with reference to a continued conversation model that is utilized to generate predicted output based on processing audio data capturing a follow-up utterance can be processed using a machine learning model, optionally along with processing recognized text from the follow-up utterance and/or representation(s) thereof. For example, a first branch of the continued conversation model can be utilized to process the audio data and generate a first branch output, a second branch of the continued conversation model can be utilized to process the recognized text and/or representations thereof and generate a second branch output, and the predicted output can be based on processing both the first branch output and the second branch output. The predicted output can dictate whether certain processing is initiated for the follow-up utterance, recognized text thereof, and/or representation(s) thereof. For example, it can dictate whether to attempt generating an action based on the recognized text and/or representation(s) thereof and/or whether to perform the action.

As an example, assume the continued conversation model is trained to generate predicted output that indicates a probability that a follow-up utterance is intended for an automated assistant, and that the follow-up utterance will be determined to be intended for the automated assistant if the probability is greater than 0.80. Also assume that an initial follow-up utterance, captured in audio data, includes "remind me to take out the trash tomorrow", but the predicted output generated based on the processing using the continued conversation model indicates a probability of only 0.7. As a result, certain processing based on the initial follow-up utterance is not performed. For example, a reminder for "tomorrow" of "take out the trash" will not be generated. Further assume that a user then invokes (e.g., using a hotword or using an assistant button) the assistant 2.5 seconds later, and then provides a subsequent utterance of "remind me to take out the trash tomorrow". Since the subsequent utterance was provided following an invocation, it can be fully processed to cause generating a reminder for "tomorrow" of "take out the trash". Thus, in the example, the user initially provided a follow-up utterance that was intended for the assistant, it wasn't recognized as being intended for the assistant, and the user quickly followed up by invoking the assistant (i.e., not in follow-up mode) and providing another instance of the utterance to cause the utterance to be fully processed by the assistant. In the example, it can be determined that the initial decision, of the follow-up utterance not being intended for the assistant, was incorrect. This can be based on one or more measures of similarity between the follow-up utterance and the further user interface input (i.e., the subsequent spoken utterance), can be based on the probability (0.7) for the initial follow-up utterance, and/or can be based on the time duration (2.5 seconds) between receiving the initial follow-up utterance and the invocation for providing the subsequent spoken utterance.

The measure(s) of similarity can include, for example, duration similarity based on comparison of durations of the initial follow-up utterance and the subsequent spoken utterance, voice similarity based on comparison of voice characteristics of the initial follow-up utterance and the subsequent spoken utterance, and/or text similarity based on comparison of recognized text of the initial follow-up utterance and the subsequent spoken utterance. Generally, the greater the similarity, the greater the likelihood that the subsequent spoken utterance will be determined to be a correction of the decision. For instance, in the example, the initial follow-up utterance and the subsequent spoken utterance will have a high degree of duration similarity, voice similarity, and text similarity. Determining that the prior decision was incorrect can additionally or alternatively be contingent on the time duration between receiving the initial follow-up utterance and the invocation being less than a threshold duration (e.g., 4.0 seconds or other threshold duration) and/or contingent on the probability for the initial decision being within a range (e.g. within 0.35 or other threshold range) of the 0.80 threshold. In other words, in such an instance, an incorrect decision will only be determined when the time duration is less than a threshold duration and the probability is within a threshold range of the 0.80 threshold.

More generally, an incorrect decision can be determined as a function of the time duration and/or the probability, without necessarily requiring those satisfy any corresponding threshold. As a non-limiting example, whether the decision is correct can be based on multiplying the difference between the probability for the initial decision and the threshold by: (1) the similarity measure (where the similarity measure is between 0 and 1 and greater values indicate greater similarity)); and/or (2) a factor that is based on the time duration (with greater factor values corresponding to greater durations), and determining whether the resulting value is less than a threshold.

Consideration of one or more of these factor(s) can mitigate occurrences of incorrectly determining false negatives and/or false positives. For example, consideration of the similarity measure will prevent determining a false negative where the initial follow-up utterance was "remind me to take out the trash tomorrow" (and was intended for another human near the user, and not for the automated assistant), and the subsequent utterance received after a subsequent invocation is "what's the square root of 256". Also, for example, consideration of the similarity measure will prevent determining a false negative where the initial follow-up utterance was "remind me to take out the trash tomorrow" (and was intended for another human near the user, and not for the automated assistant), and the subsequent utterance received after a subsequent invocation was "remind me to take out the trash tomorrow", but the subsequent utterance was received 2 minutes after the initial follow-up utterance (e.g., only after the user later determined this might be a good utterance to direct to the automated assistant).

Some particular examples of determining whether a decision, as to whether to initiate currently dormant automated assistant function(s), is incorrect, are now provided with reference to a hotword free invocation model. A hotword free invocation model can, under at least some conditions, be used to process data from one or more non-microphone sensor(s) (and/or to process abstractions of such data) to generated predicted output that, when it satisfies a threshold, will initiate currently dormant automated assistant function(s). For example, a hotword free invocation model can process vision data from vision sensor(s) of an automated assistant client device and generated predicted output that should satisfy the threshold in response to the vision data including certain hand gesture(s) of a user and/or in response to the vision data including a gaze of the user that is directed at an automated assistant client device ("directed gaze"). For instance, the hotword free invocation model can be used to invoke the automated assistant (e.g., in lieu of a hotword) in response to certain hand gesture(s) (e.g., a wave and/or a thumbs up) and/or in response to a directed gaze of at least a threshold duration.

More generally, in various implementations the hotword free invocation model can be utilized to monitor for presence of utterance free physical movement(s) (e.g., hand gesture(s) or pose(s), eye gaze, facial movement(s) or expression(s), mouth movement(s), proximity of a user to a client device, body gesture(s) or pose(s), and/or other utterance free techniques) detected via one or more non-microphone sensor components of a client device. When detected, such utterance free physical movement(s) will initiate certain processing of sensor data that follows within a threshold amount of time of the utterance free physical movement(s). The one or more non-microphone sensors can include camera(s) or other vision sensor(s), proximity sensor(s), pressure sensor(s), accelerometer(s), magnetometer(s), and/or other sensor(s), and can be used to generate sensor data that is in addition to or in lieu of audio data captured via microphone(s) of a client device. In some implementations, the utterance free physical movement(s), detected via the one or more non-microphone sensor components of the client device, can serve as a proxy for an explicit invocation hotword, and the user need not provide an explicit spoken utterance that includes an explicit invocation hotword. In other implementations, the utterance free physical movement(s), detected via the one or more non-microphone sensor components of the client device, are in addition to a spoken utterance that is captured via one or more microphones of the client device, and that includes a hotword, such as "Hey Assistant", "OK Assistant", "Assistant", or any other suitable hotword.

When the automated assistant function(s) are activated based on the predicted output, generated using the hotword free invocation model, a subsequent spoken utterance can be received and processed by the automated assistant that will directly result in corresponding action(s), included in the subsequent spoken utterance, being performed. Moreover, when the automated assistant function(s) are activated, various human perceptible cues can be provided to indicate the automated assistant function(s) are activated. These human perceptible cues can include an audible "ding", an audible "spoken output" (e.g., "Looks like you're talking to the Assistant"), a visual symbol on a display screen of the client device, an illumination of light emitting diode(s) of the client device, and/or other human perceptible cues to indicate the automated assistant function(s) are activated.

As a particular example, assume that the hotword free invocation model is trained to generate predicted output that indicates a probability of whether utterance free physical movement(s) is detected in sensor data, and that the utterance free physical movement(s) will be determined to serve as a proxy for the hotword if the probability is greater than 0.85. Also assume that the predicted output generated based on the sensor data indicates a probability of only 0.80 based on detecting: (1) movement of a mouth of a user (also referred to herein as "mouth movement"); and/or (2) that a gaze of the user is directed at a client device (also referred to herein as "directed gaze"). Further assume that a spoken utterance, captured in audio data via microphone(s) of the client device, is received 2.0 seconds after the mouth movement and/or directed gaze, includes an invoking hotword "OK Assistant", and the predicted output generated based on processing the additional audio data indicates a probability of 0.90. Thus, in the example, the user initially used mouth movement and/or directed gaze in an attempt to invoke the assistant, it wasn't recognized as serving as a proxy for an invoking hotword, and the user quickly followed up with the spoken utterance of "OK Assistant" to again attempt to invoke the assistant—and this follow-up instance was recognized as including an invoking hotword. In the example, an initial decision will be made, based on 0.80 being less than 0.85, to not initiate the certain processing of audio data responsive to the mouth movement and/or directed gaze. However, a subsequent decision will be made, based on 0.90 being greater than 0.85, to initiate the certain processing of audio data responsive to the spoken utterance. Further, in the example it can be determined that the initial decision was incorrect (i.e., the decision was a false negative). This can be based on the further user interface input (i.e., the spoken utterance) satisfying the threshold, can be based on the probability (e.g., 0.80) for the initial mouth movement and/or directed gaze, and/or the time duration (2.0 seconds) between receiving the initial mouth movement and/or directed gaze and the spoken utterance (that contradicted the initial decision satisfying the threshold as described herein. For instance, determining that the prior decision was incorrect can be a function of the time duration being less than a threshold duration (e.g., 4.0 seconds or other threshold duration) and the probability for the initial decision being within a range (e.g. within 0.35 or other range) of the 0.85 threshold. In other words, in such an instance, an incorrect decision will only be determined when the time duration is less than a threshold duration and the probability is within a threshold range of the 0.85 threshold.

In contrast, assume again that the hotword free invocation model is trained to generate predicted output that indicates a probability of whether the utterance free physical movement(s) are detected in sensor data, and that the utterance free physical movement(s) will be determined to serve as a proxy for the hotword if the probability is greater than 0.85. Also assume again that the predicted output generated based on the sensor data indicates a probability of 0.90 based on detecting: (1) mouth movement; and/or (2) directed gaze. Accordingly, an initial decision will be made, based on 0.90 being greater than 0.85, to initiate certain automated assistant functions for processing a subsequent spoken utterance that follows the mouth movement and/or directed gaze, and the client device can provide a given human perceptible cue that the client device has initiated certain automated assistant functions for processing the subsequent spoken utterance that follows mouth movement and/or directed gaze. Further assume that further user interface input is received after the mouth movement and/or directed gaze, and that the further user interface input contradicts the initial decision. Thus, in the example, the user initially directed mouth movement and/or directed gaze to the client device, it was recognized as serving as a proxy for an invoking hotword, and the user quickly followed up with further user interface input that cancelled invocation of the assistant. In the example, an initial decision will be made, based on 0.90 being greater than 0.85, to initiate certain automated assistant functions for processing subsequent audio data that follows the mouth movement and/or directed gaze. However, a subsequent decision will be made, based on the further user interface input, to deactivate or shut down the initiated certain automated assistant functions for processing the subsequent audio data that follows the mouth movement and/or directed gaze. Further, in the example it can be determined that the initial decision was incorrect (i.e., the decision was a false positive) based on the further user interface input contradicting the initial decision. The further user interface input can be additional utterance free physical movement(s) that contradicts the initial decision, a spoken utterance (e.g., "Stop", "No", and/or other spoken utterances that contradict the initial decision), can be an explicit automated assistant invocation button that negates the initial decision (e.g., a hardware button or software button), can be a sensed "squeeze" of a device that negates the initial decision (e.g., when squeezing the device with at least a threshold amount of force negates invocation of the automated assistant), and/or other further user interface input that input contradicts the initial decision. Moreover, determining the initial decision was incorrect based on the further user interface input contradicting the initial decision can be based on a further predicted output for the further user interface input, determined using the hotword free invocation model or another machine learning model disclosed herein, failing to satisfy the threshold, can be based on the time duration between receiving the initial mouth movement and/or directed gaze and the further user interface input as described herein, and/or can be based on the probability for the initial decision being within a range (e.g. within 0.35 or other range) of the 0.85 threshold as described herein.

As another example, assume again that the hotword free invocation model is trained to generate predicted output that indicates a probability of whether the utterance free physical movement(s) are detected in sensor data, and that the utterance free physical movement(s) will be determined to serve as a proxy for the hotword if the probability is greater than 0.85. Also assume again that the predicted output generated based on the sensor data indicates a probability of only 0.80 based on detecting: (1) proximity of a user to a client device (e.g., the user is within a threshold distance of the client device); and/or (2) that a gesture of the user is directed at the client device (e.g., as indicated by hand movement(s) or pose(s), body language or pose(s), and/or other gesture indications). Further assume that further user interface input is received 1.5 seconds after the initial gesture of the user when the user was within the threshold distance of the client device, and that the further user interface input is an alternate invocation of the automated assistant, such as actuation of an explicit automated assistant invocation button (e.g., a hardware button or software button), a sensed "squeeze" of a device (e.g., when squeezing the device with at least a threshold amount of force invokes the automated assistant), or other explicit automated assistant invocation. Thus, in the example, the user initially provided the gesture when the user was within the threshold distance of the client device to invoke the assistant, it wasn't recognized as serving as a proxy for an invoking hotword, and the user quickly followed up with invoking the assistant in an alternative manner. In the example, an initial decision will be made, based on 0.80 being less than 0.85, to not initiate the certain processing of audio data responsive to the initial spoken utterance. However, certain processing of audio data will be initiated responsive to the alternative invocation. Further, in the example it can be determined that the initial decision was incorrect (i.e., the decision was a false negative). This can be based on the further user interface input (i.e., the alternative invocation) actually invoking the assistant, can be based on the probability (e.g., 0.80) for the initial gesture of the user when the user was within the threshold distance of the client device and/or can be based on the time duration (e.g., 2.0 seconds) between receiving the initial gesture of the user when the user was within the threshold distance of the client device and the subsequent further user interface input (that contradicted the first by satisfying the threshold) as described herein.

Although examples are provided above of hotword free invocation models that monitor for presence of utterance free physical movement(s) that serve as a proxy for "invocation" hotwords that, when detected, will lead to certain processing of subsequent spoken utterances and/or subsequent utterance free physical movement(s) that follow within a threshold amount of time of the utterance free physical movement(s), it is understood that techniques disclosed herein can additionally or alternatively apply to utterance free physical movement(s) that are provided along with spoken utterances that include an "invocation" hotword and, at least under certain conditions, can be used to monitor for the presence of utterance free physical movement(s) and/or word(s) (inclusive of multi-word phrases) that, if determined present, will directly result in corresponding action(s) being performed.

Moreover, it is understood that techniques disclosed herein can additionally or alternatively apply to utterance free physical movement(s) that include action(s) to be performed in response thereto, such as a hand gesture for "stop" directed to the client device when an alarm is sounding or music is playing, raising a hand up or down to control the volume of a client device, and other gestures for controlling the client device without providing any spoken utterance. For example, assume a hotword free invocation model is provided that is trained to generate predicted output that indicates a probability of whether certain utterance free physical movement(s) such as a hand movement and/or pose corresponding to "stop" and/or "halt" is present in the sensor data, and that the certain utterance free physical movement(s) will be determined to be present if the probability is greater than 0.85. Further assume that the hotword free invocation model is active under certain conditions such as an alarm sounding and/or music playing and that, if the predicted output indicates the utterance free movement(s) are present, an automated assistant function of stopping any current rendering of audio output will be initiated. In other words, such a hotword free invocation model enables the user to simply provide a hand movement and/or pose corresponding to "stop" to cause a sounding alarm and/or playing music to be halted.

In some implementations, in making a decision as to whether to initiate currently dormant automated assistant function(s) and/or whether to shut down currently active automated assistant function(s), a given client device can transmit the audio data and/or other sensor data to cloud-based machine learning model(s) (e.g., cloud-based hotword detection engine, cloud-based continued conversation engine, cloud-based hotword free invocation engine, and/or other cloud-based engines). The cloud-based machine learning model(s) are often more robust than on-device machine learning model(s), and can be used to verify decisions made at the given client device. In some versions of those implementations, the cloud-based machine learning model(s) can process the audio data and/or other sensor data, can make a determination as to whether the client device should initiate certain automated assistant function(s), and can transmit, to the given client device, an indication of whether the decision made at the given client device was correct or incorrect (i.e., the decision was a false negative or a false positive). In some further versions of these implementations, the given client device can, based on the indication received from the cloud-based machine learning model(s), initiate currently dormant automated assistant function(s) and/or shut down currently active automated assistant function(s). For example, if a given client device makes a decision, based on predicted output, generated using on-device machine learning model(s), not to initiate currently dormant automated assistant function(s), transmits audio data and/or sensor data used to generate the predicted output to cloud-based machine learning model(s), and receives an indication, from the cloud-based machine learning model(s), that the decision was incorrect (i.e., the decision was a false negative), then the client device can initiate currently dormant automated assistant function(s) and utilize this instance in generating a gradient for training the on-device machine learning model(s). As another example, if a given client device makes a decision, based on predicted output, generated using on-device machine learning model(s), to initiate currently dormant automated assistant function(s), transmits audio data and/or sensor data used to generate the predicted output to cloud-based machine learning model(s), and receives an indication, from the cloud-based machine learning model(s), that the decision was incorrect (i.e., the decision was a false positive), then the client device can shut down currently active automated assistant function(s) and utilize this instance in generating a gradient for training the on-device machine learning model(s). Accordingly, in these implementations, cloud-based machine learning model(s) can be utilized, in addition to on-device machine learning model(s), in identifying false negatives and/or false negatives.

Through utilization of one or more techniques described herein, occurrences of false negatives and/or false positives, based on audio data corresponding to spoken utterance(s) and/or sensor data corresponding to utterance free physical movement(s), can be automatically identified and labeled, locally at a corresponding client device. Further, gradients can be generated using the identified and labeled false positive(s) and negative(s), locally at a corresponding client device. The gradients can be utilized, locally at a corresponding client device, to update a corresponding locally stored machine learning model and/or can be transmitted to a remote system for use in updating a corresponding global model. This results in improved performance of corresponding locally stored machine learning models and/or the corresponding global model (which can be transmitted to various client devices for use).

Additionally or alternatively, the automatic labelling at false positives and/or false negatives, locally at corresponding client devices, can maintain privacy of user data (e.g., spoken utterances, etc.) as such user data may never be transmitted from the corresponding client devices and/or will be labeled without any human review. Moreover, such automatic labeling can conserve various resources, such as network resources that would otherwise be required to transmit corresponding data (e.g., bandwidth intensive audio data and/or vision data) to client devices of human reviewers for labelling and/or client device resources of the human reviewers that would otherwise be utilized to review and manually label the corresponding data. Further, with current human labeling techniques, occurrences of false negatives may never be transmitted from the client devices to the server for human reviewing and labeling. Thus, with current techniques machine learning models may never be trained (or only minimally trained) based on actual real world occurrences of false negatives. However, implementations disclosed herein enable automatic identification and labeling of false negatives at client devices, generating of gradients based on such false negatives, and updating of a corresponding machine learning model based on the generated gradients.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Figure 1A:
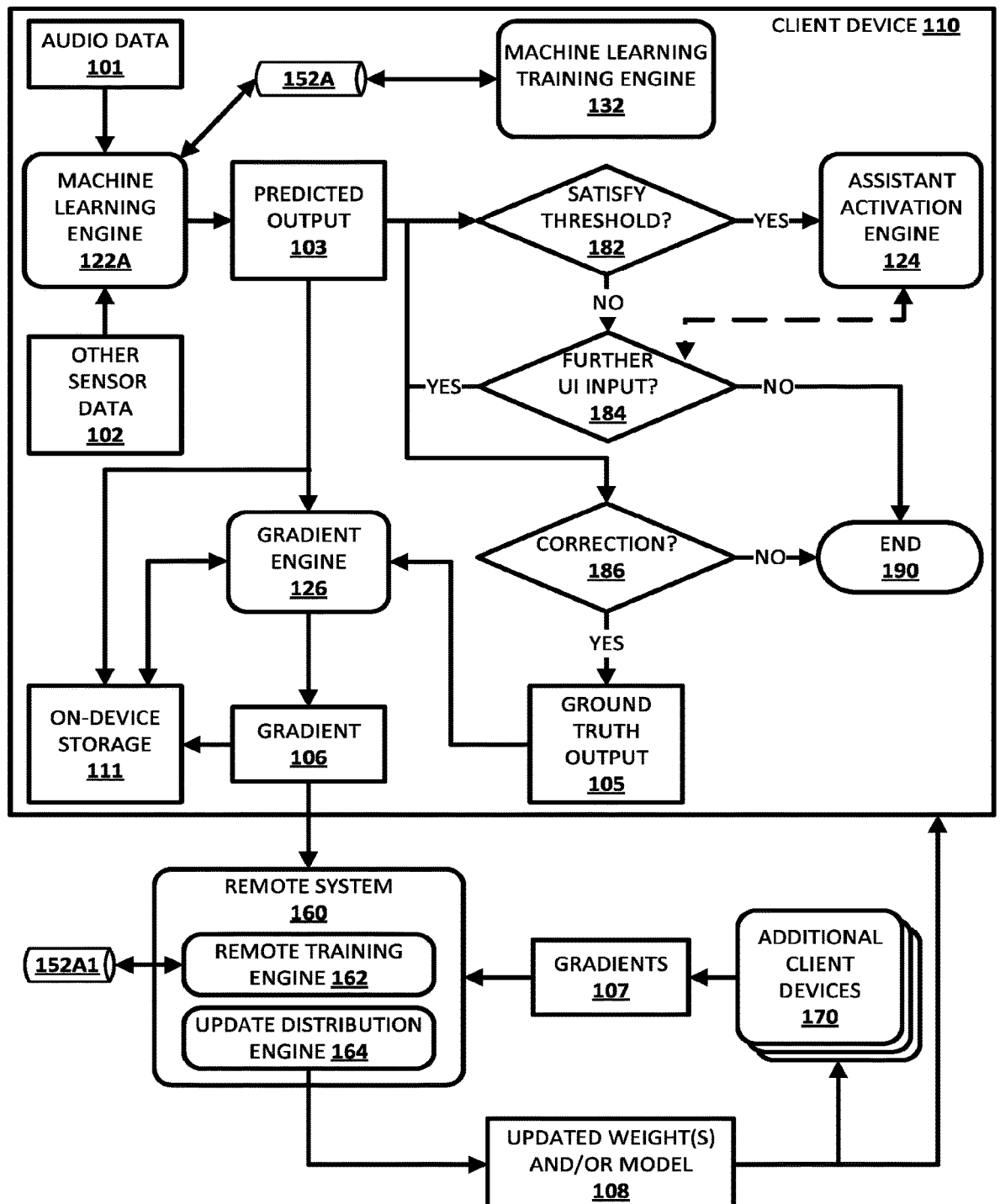
FIG. 1A, FIG. 1B, FIG. 1C, and FIG. 1D depict an example process flow that demonstrates various aspects of the present disclosure, in accordance with various implementations.

FIGS. 1A-1D depict an example process flow that demonstrates various aspects of the present disclosure. A client device 110 is illustrated in FIG. 1A, and includes the components that are encompassed within the box of FIG. 1A that represents the client device 110. Machine learning engine 122A can receive audio data 101 corresponding to a spoken utterance detected via one or more microphones of the client device 110 and/or other sensor data 102 corresponding to utterance free physical movement(s) (e.g., hand gesture(s) and/or movement(s), body gesture(s) and/or body movement(s), eye gaze, facial movement, mouth movement, etc.) detected via one or more non-microphone sensor components of the client device 110. The one or more non-microphone sensors can include camera(s) or other vision sensor(s), proximity sensor(s), pressure sensor(s), accelerometer(s), magnetometer(s), and/or other sensor(s). The machine learning engine 122A processes the audio data 101 and/or the other sensor data 102, using machine learning model 152A, to generate a predicted output 103. As described herein, the machine learning engine 122A can be a hotword detection engine 122B, a hotword free invocation engine 122C, a continued conversation engine 122D, and alternative engines, such as a voice activity detector (VAD) engine, an endpoint detector engine, and/or other engine(s).

In some implementations, when the machine learning engine 122A generates the predicted output 103, it can be stored locally on the client device in on-device storage 111, and optionally in association with the corresponding audio data 101 and/or the other sensor data 102. In some versions of those implementations, the predicted output can be retrieved by gradient engine 126 for utilization in generating a gradient 106 at a later time, such as when one or more conditions described herein are satisfied. The on-device storage 111 can include, for example, read-only memory (ROM) and/or random-access memory (RAM). In other implementations, the predicted output 103 can be provided to the gradient engine 126 in real-time.

The client device 110 can make a decision, based on determining whether the predicted output 103 satisfies a threshold at block 182, of whether to initiate currently dormant automated assistant function(s) (e.g., automated assistant 295 of FIG. 2), refrain from initiating currently dormant automated assistant function(s), and/or shut down currently active automated assistant function(s) using an assistant activation engine 124. The automated assistant functions can include: speech recognition to generate recognized text, natural language understanding (NLU) to generate NLU output, generating a response based on the recognized text and/or the NLU output, transmission of the audio data to a remote server, and/or transmission of the recognized text to the remote server. For example, assume the predicted output 103 is a probability (e.g., 0.80 or 0.90) and the threshold at block 182 is a threshold probability (e.g., 0.85), if the client device 110 determines the predicted output 103 (e.g., 0.90) satisfies the threshold (e.g., 0.85) at block 182, then the assistant activation engine 124 can initiate the currently dormant automated assistant function(s).

Figure 1B:
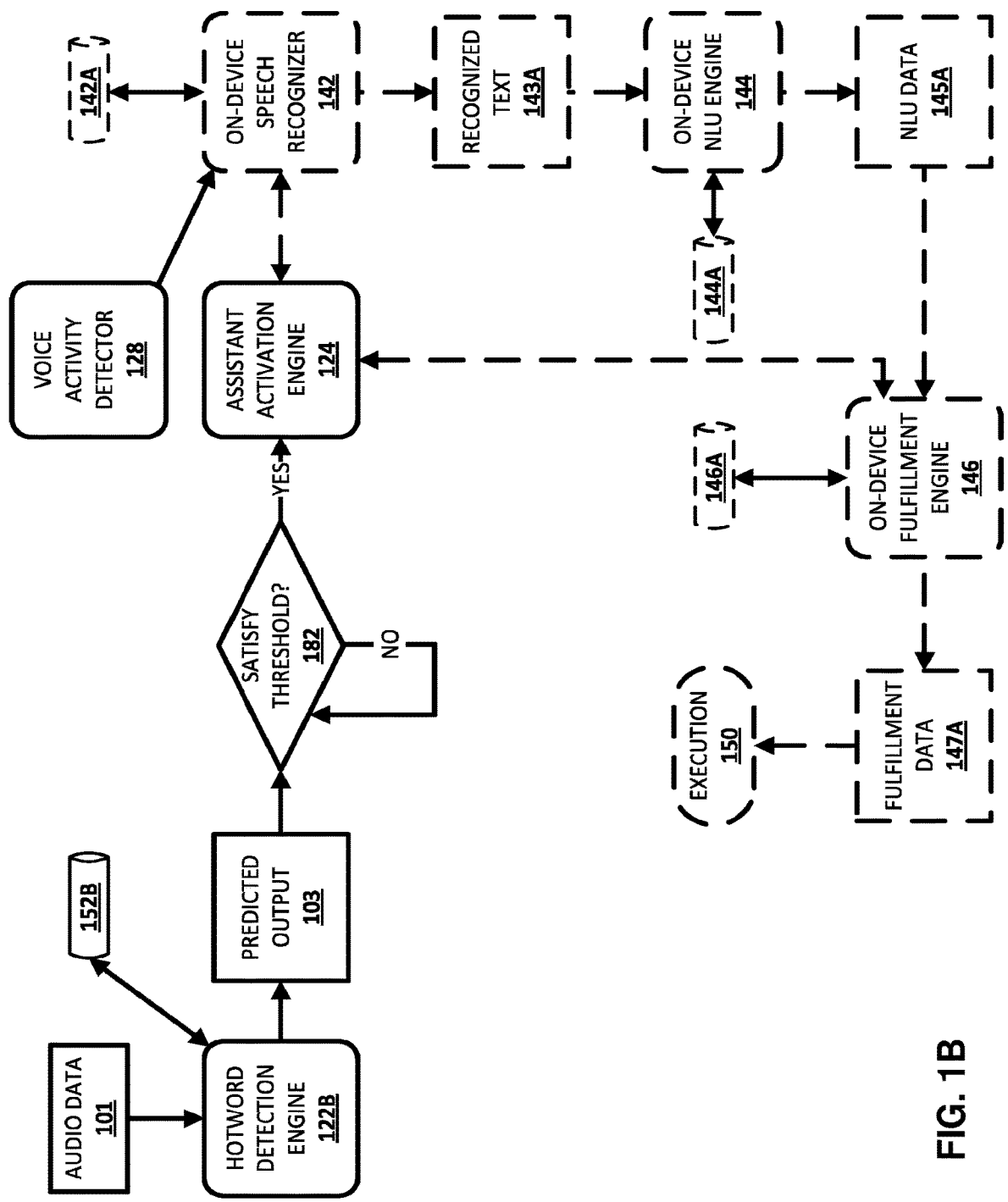

In some implementations, and as depicted in FIG. 1B, the machine learning engine 122A can be a hotword detection engine 122B. Notably, various automated assistant function(s), such as on-device speech recognizer 142, on-device NLU engine 144, and/or on-device fulfillment engine 146, are currently dormant (i.e., as indicated by dashed lines). Further, assume that the predicted output 103, generated using a hotword detection model 152B and based on the audio data 101, satisfies the threshold at block 182, and that voice activity detector 128 detects user speech directed to the client device 110.

In some versions of these implementations, the assistant activation engine 124 activates the on-device speech recognizer 142, the on-device NLU engine 144, and/or the on-device fulfillment engine 146 as the currently dormant automated assistant function(s). For example, the on-device speech recognizer 142 can process the audio data 101 for a spoken utterance, including a hotword "OK Assistant" and additional commands and/or phrases that follow the hotword "OK Assistant", using on-device speech recognition model 142A, to generate recognized text 143A, the on-device NLU engine 144 can process the recognized text 143A, using on-device NLU model 144A, to generate NLU data 145A, the on-device fulfillment engine 146 can process the NLU data 145A, using on-device fulfillment model 146A, to generate fulfillment data 147A, and the client device 110 can use the fulfillment data 147A in execution 150 of one or more actions that are responsive to the audio data 101.

In other versions of these implementations, the assistant activation engine 124 activates the only on-device fulfillment engine 146, without activating the on-device speech recognizer 142 and the on-device NLU engine 144, to process various commands, such as "No", "Stop", "Cancel", and/or other commands that can be processed without the on-device speech recognizer 142 and the on-device NLU engine 144. For example, the on-device fulfillment engine 146 processes the audio data 101, using the on-device fulfillment model 146A, to generate the fulfillment data 147A, and the client device 110 can use the fulfillment data 147A in execution 150 of one or more actions that are responsive to the audio data 101. Moreover, in versions of these implementations, the assistant activation engine 124 can initially activate the currently dormant automated function(s) to verify the decision made at block 182 was correct (e.g., the audio data 101 does in fact include the hotword "OK Assistant") by initially only activating the on-device speech recognizer 142 to determine the audio data 101 include the hotword "OK Assistant", and/or the assistant activation engine 124 can transmit the audio data 101 to one or more servers (e.g., remote server 160) to verify the decision made at block 182 was correct (e.g., the audio data 101 does in fact include the hotword "OK Assistant").

Figure 1C:
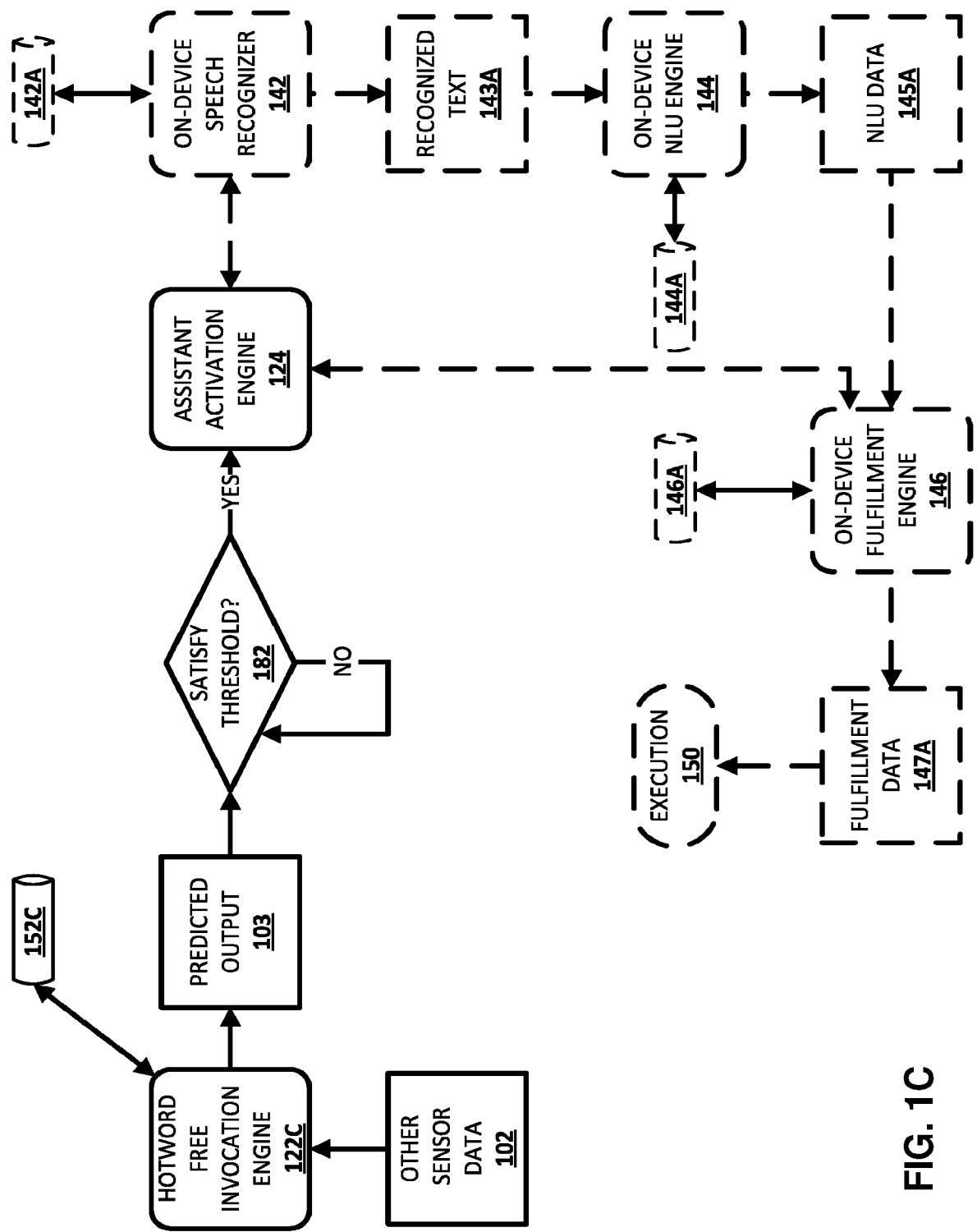

In some implementations, and as depicted in FIG. 1C, the machine learning engine 122A can be a hotword free invocation engine 122C. Notably, various automated assistant function(s), such as the on-device speech recognizer 142, the on-device NLU engine 144, and/or the on-device fulfillment engine 146, are currently dormant (i.e., as indicated by dashed lines). Further, assume that the predicted output 103, generated using a hotword free invocation model 152C and based on the other sensor data 102, satisfies the threshold at block 182, and that voice activity detector 128 detects user speech directed to the client device 110.

In some versions of these implementations, the assistant activation engine 124 activates the on-device speech recognizer 142, the on-device NLU engine 144, and/or the on-device fulfillment engine 146 as the currently dormant automated assistant function(s). For example, in response to activating these automated assistant functions(s) for the utterance free physical movement(s) that serve as a proxy for a hotword, the on-device speech recognizer 142 can process commands and/or phrases that occur along with and/or follow the utterance free physical movement(s) that serve as a proxy for a hotword, using the on-device speech recognition model 142A, to generate the recognized text 143A, the on-device NLU engine 144 can process the recognized text 143A, using the on-device NLU model 144A, to generate the NLU data 145A, the on-device fulfillment engine 146 can process the NLU data 145A, using the on-device fulfillment model 146A, to generate the fulfillment data 147A, and the client device 110 can use the fulfillment data 147A in the execution 150 of one or more actions that are responsive to the audio data 101.

In other versions of these implementations, the assistant activation engine 124 activates the only on-device fulfillment engine 146, without activating the on-device speech recognizer 142 and the on-device NLU engine 144, to process various commands, such as "No", "Stop", "Cancel", and/or other commands. For example, the on-device fulfillment engine 146 processes commands or phrases that occur along with and/or follow the utterance free physical movement(s), using the on-device fulfillment model 146A, to generate the fulfillment data 147A, and the client device 110 can use the fulfillment data 147A in execution 150 of one or more actions that are responsive to the commands or phrases that occur along with and/or follow the utterance free physical movement(s).

Moreover, in some versions of these implementations, the assistant activation engine 124 can initially activate the currently dormant automated function(s) to verify the decision made at block 182 was correct (e.g., the utterance free physical movement(s) captured by the other sensor data 102 was in fact intended to serve as a proxy for a hotword) by initially only activating the on-device speech recognizer 142 to determine the commands and/or phrases that occur along with and/or follow the utterance free physical movement(s) were intended for the assistant, and/or the assistant activation engine 124 can transmit the other sensor data 102 to one or more servers (e.g., remote server 160) to verify the decision made at block 182 was correct (e.g., the utterance free physical movement(s) captured by the other sensor data 102 was in fact intended to serve as a proxy for a hotword).

Figure 1D:
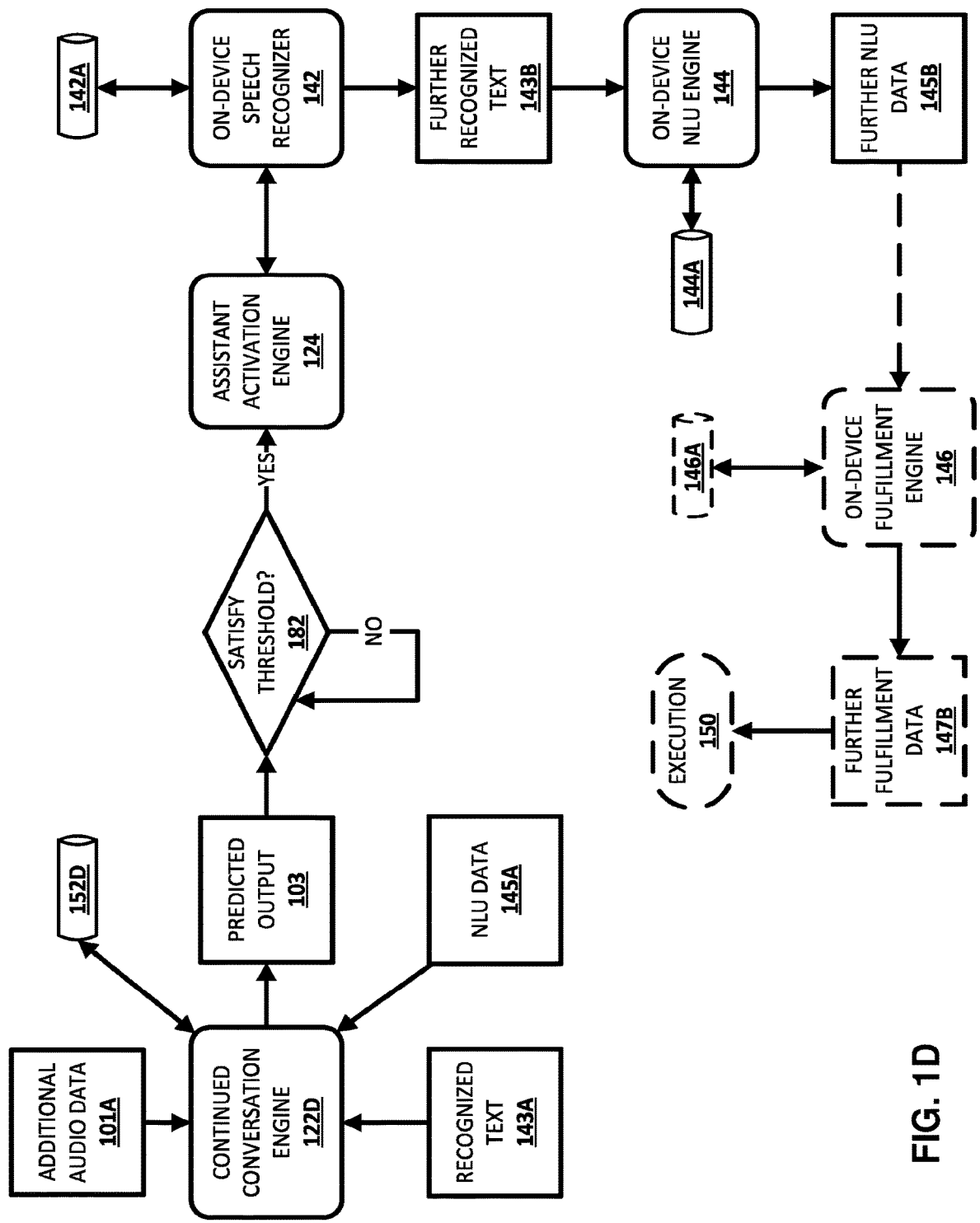

In some implementations, and as depicted in FIG. 1D, the machine learning engine 122A is a continued conversation engine 122D. Notably, various automated assistant function(s), such as the on-device speech recognizer 142 and the on-device NLU engine 144, are already active (i.e., as indicated by solid lines) as a result of prior interaction(s) with the assistant (e.g., as a result of a spoken utterance including a hotword and/or utterance free physical movement(s) that serve as a proxy for a hotword). The client device 110 may retrieve (e.g., from the on-device storage 111) the recognized text 143A and/or the NLU data 145A from these prior interaction(s). For example, additional audio data 101A that captures a subsequent spoken utterance can be received (i.e., after the spoken utterance including a hotword and/or utterance free physical movement(s) that serve as a proxy for a hotword that triggered the automated assistant) and can be a follow-up request, clarification response, response to a prompt from the automated assistant, additional user request, and/or other interaction(s) with the automated assistant. Further, assume that the predicted output 103, generated using a continued conversation model 152D and based on the additional audio data 101A, the recognized text 143A from the prior interaction(s), and the NLU data 145A from the prior interaction(s), satisfies the threshold at block 182, and that voice activity detector 128 detects user speech directed to the client device 110.

In some versions of these implementations, the assistant activation engine 124 refrains from shutting down the on-device speech recognizer 142 and the on-device NLU 144, and activates the on-device fulfillment engine 146 as the currently dormant automated assistant function(s). For example, the on-device speech recognizer 142 can process the additional audio data 101A for a subsequent spoken utterance, omitting a hotword "OK Assistant", using on-device speech recognition model 142A, to generate further recognized text 143B, the on-device NLU engine 144 can process the further recognized text 143B, using on-device NLU model 144A, to generate further NLU data 145B, the on-device fulfillment engine 146 can process the further NLU data 145B, using on-device fulfillment model 146A, to generate further fulfillment data 147B, and the client device 110 can use the further fulfillment data 147A in the execution 150 of one or more actions that are responsive to the additional audio data 101A.

Moreover, in some versions of these implementations, the assistant activation engine 124 can initially activate the currently dormant automated assistant function(s) to verify the decision made at block 182 was correct (e.g., the additional audio data 101A is in fact intended for the automated assistant) by initially only processing the additional audio data 101A, using the on-device speech recognizer 142, and/or the assistant activation engine 124 can transmit the additional audio data 101A to one or more servers (e.g., remote server 160) to verify the decision made at block 182 was correct (e.g., the additional audio data 101A is in fact intended for the automated assistant).

Turning back to FIG. 1A, if the client device 110 determines the predicted output 103 (e.g., 0.80) fails to satisfy the threshold (e.g., 0.85) at block 182, then the assistant activation engine 124 can refrain from initiating the currently dormant automated assistant function(s) and/or shut down any currently active automated assistant function(s). Further, if the client device 110 determines the predicted output 103 (e.g., 0.80) fails to satisfy the threshold (e.g., 0.85) at block 182, then the client device 110 can determine if further user interface input is received at block 184. For example, the further user interface input can be an additional spoken utterance that includes a hotword, additional utterance free physical movement(s) that serve as a proxy for a hotword, actuation of an explicit automated assistant invocation button (e.g., a hardware button or software button), a sensed "squeeze" of the client device 110 device (e.g., when squeezing the client device 110 with at least a threshold amount of force invokes the automated assistant), and/or other explicit automated assistant invocation. If the client device 110 determines there is no further user interface input received at block 184, then the client device 110 can stop identifying corrections and end at block 190.

However, if the client device 110 determines there is further user interface input received at block 184, then the system can determine whether the further user interface input received at block 184 contradicts the decision made at block 182 includes correction(s) at block 186. The correction(s) can either identify a false negative (e.g., as described in more detail with respect to FIG. 3) or a false positive (e.g., as described in more detail with respect to FIG. 4). If the client device determines the further user interface input received at block 184 does not include a correction at block 186, the client device 110 can stop identifying corrections and end at block 190. However, if the client device 110 determines that the further user interface input received at block 184 includes a correction at block 186 that contradicts the initial decision made at block 182, then the client device 110 can determine ground truth output 105.

As one non-limiting example of a false negative, assume that the machine learning engine 122A is trained to generate a probability as the predicted output 103, that the client device 110 incorrectly determined the predicted output 103 (e.g., 0.80) fails to satisfy the threshold at block 182 (e.g., 0.85), and that the client device 110 refrained from initiating currently dormant automated assistant function(s) and/or shut down currently active automated assistant function(s). Further, assume that the client device 110 determined, based on the further user interface input received at block 184, that the further user interface input contradicts the initial decision made at block 182, and that the client device 110 should have initiated currently dormant automated assistant function(s) and/or refrained from shutting down currently active automated assistant function(s). In this instance, the ground truth output 105 can also be a probability (e.g., 1.00) that indicates the client device 110 should have initiated currently dormant automated assistant function(s) and/or refrained from shutting down currently active automated assistant function(s).

As one non-limiting example of a false positive, assume that the machine learning engine 122A is trained to generate a probability as the predicted output 103, that the client device 110 incorrectly determined the predicted output 103 (e.g., 0.90) satisfies the threshold at block 182 (e.g., 0.85), and that the client device 110 initiated currently dormant automated assistant function(s) and/or refrained from shutting down currently active automated assistant function(s). Further, assume that the client device 110 determined, based on the further user interface input received at block 184, that the further user interface input contradicts the initial decision made at block 182, and that the client device 110 should not have initiated currently dormant automated assistant function(s) and/or refrained from shutting down currently active automated assistant function(s). In this instance, the ground truth output 105 can also be a probability (e.g., 0.00) that indicates the client device 110 should not have initiated currently dormant automated assistant function(s) and/or refrained from shutting down currently active automated assistant function(s). Although the predicted output 103 and the ground truth output 105 are described herein as being probabilities, it should be understood that is not meant to be limiting and that the predicted output 103 and the ground truth output 105 can be labels, annotations, binary values, and/or other likelihood measures.

In some implementations, the gradient engine 126 can generate the gradient 106 based on the predicted output 103 to the ground truth output 105. For example, the gradient engine 126 can generate the gradient 106 based on comparing the predicted output 103 to the ground truth output 105. In some versions of those implementations, the client device 110 stores, locally in the on-device storage 111, the predicted output 103 and the corresponding ground truth output 105, and the gradient engine 126 retrieves the the predicted output 103 and the corresponding ground truth output 105 to generate the gradient 106 when one or more conditions are satisfied. The one or more conditions can include, for example, that the client device is charging, that the client device has at least a threshold state of charge, that a temperature of the client device (based on one or more on-device temperature sensors) is less than a threshold, and/or that the client device is not being held by a user. In other versions of those implementations, the client device 110 provides the predicted output 103 and the ground truth output 105 to the gradient engine 126 in real-time, and the gradient engine 126 generates the gradient 106 in real-time.

Moreover, the gradient engine 126 can provide the generated gradient 106 to on-device machine learning training engine 132A. The on-device machine learning training engine 132A, when it receives the gradient 106, uses the gradient 106 to update the on-device machine learning model 152A. For example, the on-device machine learning training engine 132A can utilize backpropagation and/or other techniques to update the on-device machine learning model 152A. It is noted that, in some implementations, the on-device machine learning training engine 132A can utilize batch techniques to update the on-device machine learning model 152A based on the gradient 106 and additional gradients determined locally at the client device 110 on the basis of additional corrections.

Further, the client device 110 can transmit the generated gradient 106 to a remote system 160. When the remote system 160 receives the gradient 106, a remote training engine 162 of the remote system 160 uses the gradient 106, and additional gradients 107 from additional client devices 170, to update global weights of a global speech recognition model 152A1. The additional gradients 107 from the additional client devices 170 can each be generated based on the same or similar technique as described above with respect to the gradient 106 (but on the basis of locally identified corrections that are particular to those client devices).

An update distribution engine 164 can, responsive to one or more conditions being satisfied, provide, to the client device 110 and/or other client device(s), the updated global weights and/or the updated global speech recognition model itself, as indicated by 108. The one or more conditions can include, for example, a threshold duration and/or quantity of training since updated weights and/or an updated speech recognition model was last provided. The one or more conditions can additionally or alternatively include, for example, a measured improvement to the updated speech recognition model and/or passage of a threshold duration of time since updated weights and/or an updated speech recognition model was last provided. When the updated weights are provided to the client device 110, the client device 110 can replace weights, of the on-device machine learning model 152A, with the updated weights. When the updated global speech recognition model is provided to the client device 110, the client device 110 can replace the on-device machine learning model 152A with the updated global speech recognition model.

In some implementations, the on-device machine learning model 152A is transmitted (e.g., by the remote system 160 or other component(s)) for storage and use at the client device 110, based on a geographic region and/or other properties of the client device 110 and/or a user of the client device 110. For example, the on-device machine learning model 152A can be one of N available machine learning models for a given language, but can be trained based on corrections that are specific to a particular geographic region and provided to client device 110 based on the client device 110 being primarily located in the particular geographic region.

Figure 2:
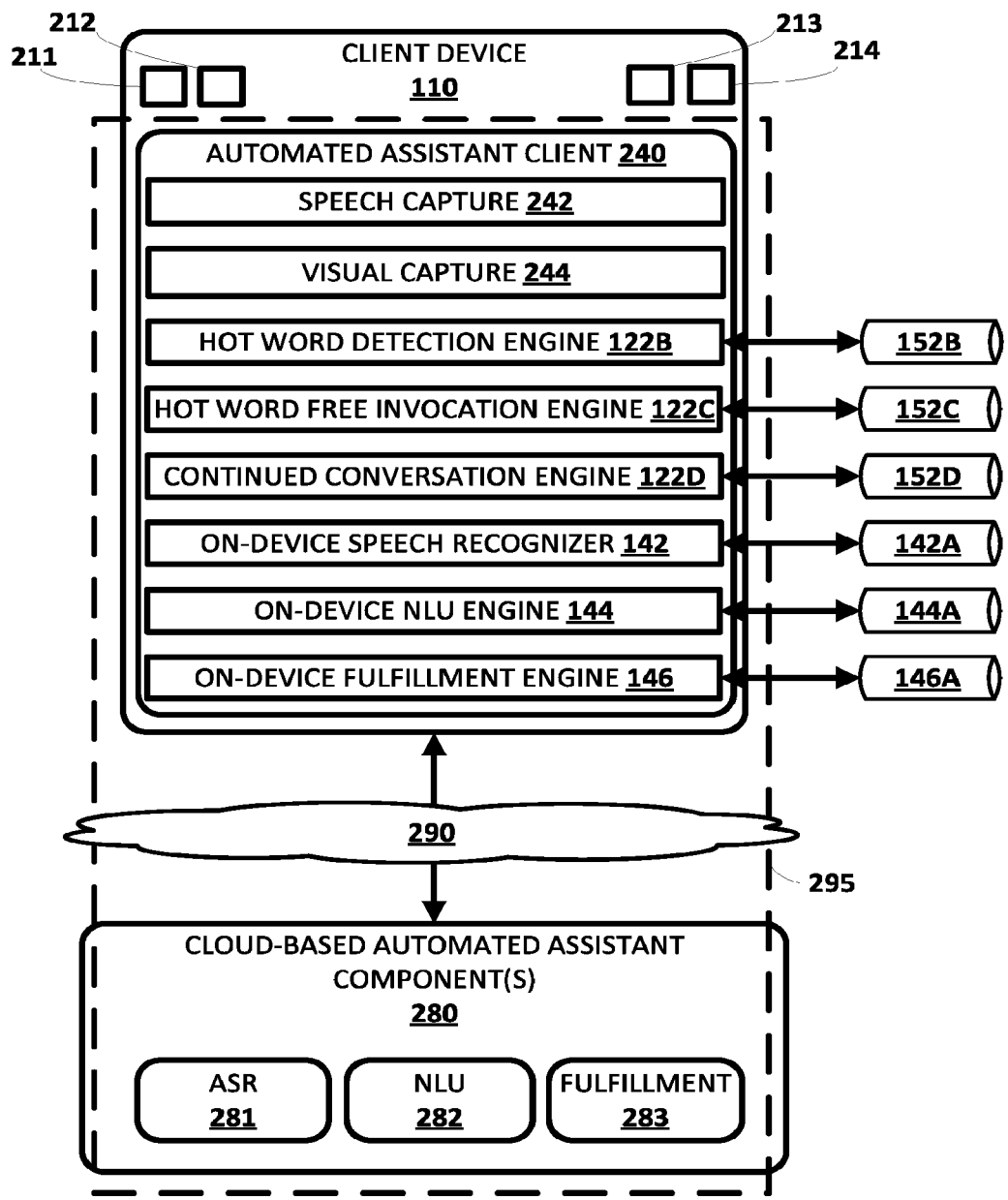
FIG. 2 depicts a block diagram of an example environment that includes various components from FIG. 1A, FIG. 1B, FIG. 1C, and FIG. 1D, and in which implementations disclosed herein may be implemented.

Turning now to FIG. 2, client device 110 is illustrated in an implementation where the various on-device machine learning engines of FIGS. 1A-1D are included as part of (or in communication with) an automated assistant client 240. The respective machine learning models are also illustrated interfacing with the various on-device machine learning engines of FIGS. 1A-1D. Other components from FIGS. 1A-1D are not illustrated in FIG. 2 for simplicity. FIG. 2 illustrates one example of how the various on-device machine learning engines of FIGS. 1A-1D and their respective machine learning models can be utilized by the automated assistant client 240 in performing various actions.

The client device 110 in FIG. 2 is illustrated with one or more microphones 211, one or more speakers 212, one or more cameras and/or other vision components 213, and display(s) 214 (e.g., a touch-sensitive display). The client device 110 may further include pressure sensor(s), proximity sensor(s), accelerometer(s), magnetometer(s), and/or other sensor(s) that are used to generate other sensor data that is in addition to audio data captured by the one or more microphones 211. The client device 110 at least selectively executes the automated assistant client 240. The automated assistant client 240 includes, in the example of FIG. 2, the on-device hotword detection engine 122B, the on-device hotword free invocation engine 122C, the continued conversation engine 122D, the on-device speech recognizer 142, the on-device natural language understanding (NLU) engine 144, and the on-device fulfillment engine 146. The automated assistant client 240 further includes speech capture engine 242 and visual capture engine 244. The automated assistant client 140 can include additional and/or alternative engines, such as a voice activity detector (VAD) engine, an endpoint detector engine, and/or other engine(s).

One or more cloud-based automated assistant components 280 can optionally be implemented on one or more computing systems (collectively referred to as a "cloud" computing system) that are communicatively coupled to client device 110 via one or more local and/or wide area networks (e.g., the Internet) indicated generally at 290. The cloud-based automated assistant components 280 can be implemented, for example, via a cluster of high-performance servers.

In various implementations, an instance of an automated assistant client 240, by way of its interactions with one or more cloud-based automated assistant components 280, may form what appears to be, from a user's perspective, a logical instance of an automated assistant 295 with which the user may engage in a human-to-computer interactions (e.g., spoken interactions, gesture-based interactions, and/or touch-based interactions).

The client device 110 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client devices may be provided.

The one or more vision components 213 can take various forms, such as monographic cameras, stereographic cameras, a LIDAR component (or other laser-based component(s)), a radar component, etc. The one or more vision components 213 may be used, e.g., by the visual capture engine 242, to capture vision frames (e.g., image frames, laser-based vision frames) of an environment in which the client device 110 is deployed. In some implementations, such vision frame(s) can be utilized to determine whether a user is present near the client device 110 and/or a distance of the user (e.g., the user's face) relative to the client device 110. Such determination(s) can be utilized, for example, in determining whether to activate the various on-device machine learning engines depicted in FIG. 2, and/or other engine(s).

Speech capture engine 242 can be configured to capture user's speech and/or other audio data captured via microphone(s) 211. Further, the client device 110 may include pressure sensor(s), proximity sensor(s), accelerometer(s), magnetometer(s), and/or other sensor(s) that are used to generate other sensor data that is in addition to the audio data captured via the microphone(s) 211. As described herein, such audio data and other sensor data can be utilized by the hotword detection engine 122B, the hotword free invocation engine 122C, the continued conversation engine 122D, and/or other engine(s) to determine whether to initiate one or more currently dormant automated assistant functions, refrain from initiating one or more currently dormant automated assistant functions, and/or shut down one or more currently active automated assistant functions. The automated assistant functions can include the on-device speech recognizer 142, the on-device NLU engine 144, the on-device fulfillment engine 146, and additional and/or alternative engines. For example, on-device speech recognizer 142 can process audio data that captures a spoken utterance, utilizing on-device speech recognition model 142A, to generate recognized text 143A that corresponds to the spoken utterance. On-device NLU engine 144 performs on-device natural language understanding, optionally utilizing on-device NLU model 144A, on the recognized text 143A to generate NLU data 145A. The NLU data 145A can include, for example, intent(s) that correspond to the spoken utterance and optionally parameter(s) (e.g., slot values) for the intent(s). Further, the on-device fulfillment engine 146 generates the fulfillment data 147A, optionally utilizing on-device fulfillment model 146A, based on the NLU data 145A. This fulfillment data 147A can define local and/or remote responses (e.g., answers) to the spoken utterance, interaction(s) to perform with locally installed application(s) based on the spoken utterance, command(s) to transmit to Internet-of-things (IoT) device(s) (directly or via corresponding remote system(s)) based on the spoken utterance, and/or other resolution action(s) to perform based on the spoken utterance. The fulfillment data 147A is then provided for local and/or remote performance/execution of the determined action(s) to resolve the spoken utterance. Execution can include, for example, rendering local and/or remote responses (e.g., visually and/or audibly rendering (optionally utilizing a local text-to-speech module)), interacting with locally installed applications, transmitting command(s) to IoT device(s), and/or other action(s).

Display(s) 214 can be utilized to the recognized text 143A and/or the further recognized text 143B from the on-device speech recognizer 122, and/or one or more results from the execution 150. Display(s) 214 can further be one of the user interface output component(s) through which visual portion(s) of a response, from the automated assistant client 240, is rendered.

In some implementations, cloud-based automated assistant component(s) 280 can include a remote ASR engine 281 that performs speech recognition, a remote NLU engine 282 that performs natural language understanding, and/or a remote fulfillment engine 284 that generates fulfillment. A remote execution module can also optionally be included that performs remote execution based on local or remotely determined fulfillment data. Additional and/or alternative remote engines can be included. As described herein, in various implementations on-device speech processing, on-device NLU, on-device fulfillment, and/or on-device execution can be prioritized at least due to the latency and/or network usage reductions they provide when resolving a spoken utterance (due to no client-server roundtrip(s) being needed to resolve the spoken utterance). However, one or more cloud-based automated assistant component(s) 280 can be utilized at least selectively. For example, such component(s) can be utilized in parallel with on-device component(s) and output from such component(s) utilized when local component(s) fail. For example, the on-device fulfillment engine 246 can fail in certain situations (e.g., due to relatively limited resources of client device 110) and remote fulfillment engine 283 can utilize the more robust resources of the cloud to generate fulfillment data in such situations. The remote fulfillment engine 283 can be operated in parallel with the on-device fulfillment engine 246 and its results utilized when on-device fulfillment fails, or can be invoked responsive to determining failure of the on-device fulfillment engine 246.

In various implementations, an NLU engine (on-device and/or remote) can generate NLU data that includes one or more annotations of the recognized text and one or more (e.g., all) of the terms of the natural language input. In some implementations an NLU engine is configured to identify and annotate various types of grammatical information in natural language input. For example, an NLU engine may include a morphological module that may separate individual words into morphemes and/or annotate the morphemes, e.g., with their classes. An NLU engine may also include a part of speech tagger configured to annotate terms with their grammatical roles. Also, for example, in some implementations an NLU engine may additionally and/or alternatively include a dependency parser configured to determine syntactic relationships between terms in natural language input.

In some implementations, an NLU engine may additionally and/or alternatively include an entity tagger configured to annotate entity references in one or more segments such as references to people (including, for instance, literary characters, celebrities, public figures, etc.), organizations, locations (real and imaginary), and so forth. In some implementations, an NLU engine may additionally and/or alternatively include a coreference resolver (not depicted) configured to group, or "cluster," references to the same entity based on one or more contextual cues. In some implementations, one or more components of an NLU engine may rely on annotations from one or more other components of the NLU engine.

An NLU engine may also include an intent matcher that is configured to determine an intent of a user engaged in an interaction with automated assistant 295. An intent matcher can use various techniques to determine an intent of the user. In some implementations, an intent matcher may have access to one or more local and/or remote data structures that include, for instance, a plurality of mappings between grammars and responsive intents. For example, the grammars included in the mappings can be selected and/or learned over time, and may represent common intents of users. For example, one grammar, "play <artist>", may be mapped to an intent that invokes a responsive action that causes music by the <artist> to be played on the client device 110. Another grammar, "[weather|forecast] today," may be match-able to user queries such as "what's the weather today" and "what's the forecast for today?" In addition to or instead of grammars, in some implementations, an intent matcher can employ one or more trained machine learning models, alone or in combination with one or more grammars. These trained machine learning models can be trained to identify intents, e.g., by embedding recognized text from a spoken utterance into a reduced dimensionality space, and then determining which other embeddings (and therefore, intents) are most proximate, e.g., using techniques such as Euclidean distance, cosine similarity, etc. As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Other slot value(s) can be inferred based on, for example, user location, currently rendered content, user preferences, and/or other cue(s).

A fulfillment engine (local and/or remote) can be configured to receive the predicted/estimated intent that is output by an NLU engine, as well as any associated slot values and fulfill (or "resolve") the intent. In various implementations, fulfillment (or "resolution") of the user's intent may cause various fulfillment information (also referred to as fulfillment data) to be generated/obtained, e.g., by fulfillment engine. This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

Figure 3:
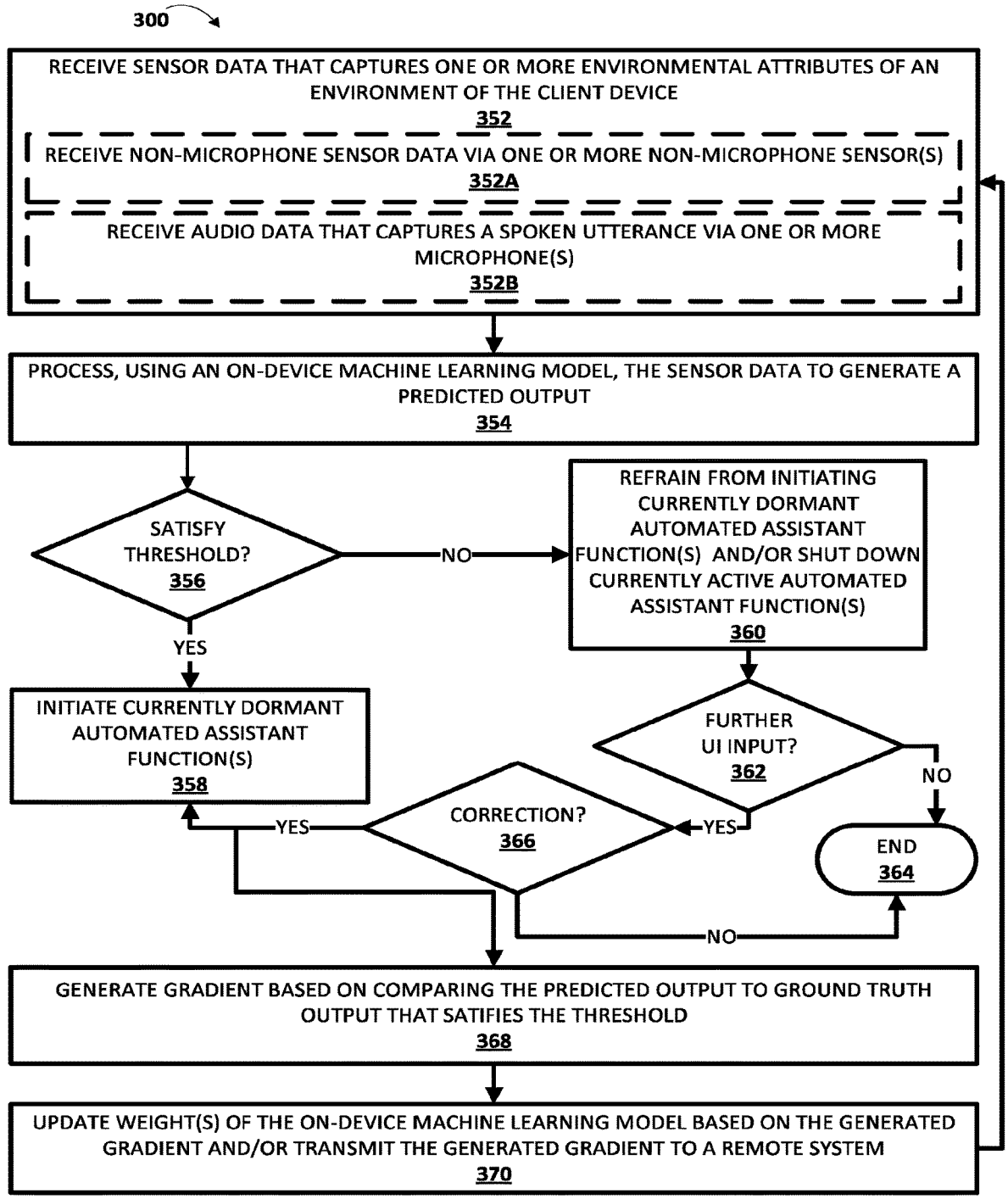
FIG. 3 depicts a flowchart illustrating an example method of generating a gradient, locally at a client device, based on a false negative, and transmitting the gradient to a remote server and/or utilizing the generated gradient to update weight(s) of an on-device speech recognition model.

FIG. 3 depicts a flowchart illustrating an example method 300 of generating a gradient, locally at a client device, based on a false negative, and transmitting the gradient to a remote server and/or utilizing the generated gradient to update weight(s) of an on-device speech recognition model. For convenience, the operations of the method 300 are described with reference to a system that performs the operations. This system of method 300 includes one or more processors and/or other component(s) of a client device. Moreover, while operations of the method 300 are shown in a particular order, this is not meant to be limiting. One or more operations may be reordered, omitted, or added.

At block 352, the system receives sensor data that captures one or more environmental attributes of an environment of the client device. In some implementations, as indicated by optional block 352A, the sensor data is non-microphone sensor data received via non-microphone sensors. In some versions of those implementations, the sensor data includes one or more images from a camera of one or more sensor components, proximity sensor data from a proximity sensor of the one or more sensor components, accelerometer data from an accelerometer of the one or more sensor components, and/or magnetometer data from a magnetometer of the one or more sensor components. In some implementations, as indicated by optional block 352B, the sensor data is audio data that captures a spoken utterance and is received via one or more microphones.

At block 354, the system processes, using an on-device machine learning model, the sensor data to generate a predicted output. The on-device machine learning model can be, for example, a hotword detection model, a continued conversation model, a hotword free invocation model, and/or other machine learning models. Further, the generated output can be, for example, a probability and/or other likelihood measures.

At block 356, the system determines whether the predicted output generated at block 354 satisfies a threshold. If, at an iteration of block 356, the system determines the predicted output generated at block 354 satisfies a threshold, then the system proceeds to block 358 and initiates one or more currently dormant automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, and/or transmission of the recognized text to the remote server. For example, assume the predicted output, generated at block 354, is a probability and the probability must be greater than 0.85 to activate one or more currently dormant automated assistant functions, and the predicted probability is 0.88. Based on the predicted probability of 0.88 satisfying the threshold of 0.85, the system proceeds to block 358 and initiates the one or more currently dormant automated assistant functions as the user intended.

If, at an iteration of block 356, the system determines the predicted output generated at block 354 fails to satisfy a threshold, then the system proceeds to block 360 and refrains from initiating one or more currently dormant automated assistant functions and/or shuts down one or more currently active automated assistant functions. For example, assume the predicted output, generated at block 354, is a probability and the probability must be greater than 0.85 to activate one or more currently dormant automated assistant functions, the predicted probability is only 0.82. Based on the predicted probability of 0.82 failing to satisfy the threshold of 0.85, the system proceeds to block 360 and refrains from initiating one or more currently dormant automated assistant functions and/or shuts down one or more currently active automated assistant functions. However, the system can perform further processing to determine whether the system should have initiated the one or more currently dormant automated assistant functions in response to receiving the sensor despite the generated predicted output failing to satisfy the threshold.

At block 362, the system determines whether further user interface input is received. In some implementations, the further user interface input is further audio data that captures a subsequent spoken utterance and is received via the one or more microphones. In some versions of those implementations, the subsequent spoken utterance repeats at least a portion of the spoken utterance received at optional block 352B. In other versions of those implementations, the subsequent spoken utterance is not related to the spoken utterance received at optional block 352B. In some implementations, the further user interface input is further non-microphone sensor data received via the non-microphone sensors. In some versions of those implementations, the further non-microphone sensor data includes one or more images from a camera of one or more sensor components, proximity sensor data from a proximity sensor of the one or more sensor components, accelerometer data from an accelerometer of the one or more sensor components, and/or magnetometer data from a magnetometer of the one or more sensor components. If, at an iteration of block 362, the system determines there is no further user interface input, then the system proceeds to block 364 and the method 300 ends. If, at an iteration of block 362, the system determines there is further user interface input received at the client device, then the system proceeds to block 366.

At block 366, the system determines whether the further user interface input received at block 362 indicates a correction of the decision made at block 356. If, at an iteration of block 366, the system determines the further user interface input received at block 362 does not indicate a correction of the decision made at block 356, then the system proceeds to block 364 and the method 300 ends. If, at an iteration of block 366, the system determines the further user interface input received at block 362 indicates correction of the decision made at block 356, then the system returns to block 358 and initiates one or more currently dormant automated assistant functions. Accordingly, when it is determined there is a correction at block 366, the incorrect decision made at block 356 can be classified as an occurrence of a false negative.

With respect to a hotword detection model (e.g., hotword detection model 152B of FIG. 1B), assume that the received sensor data is audio data that captures a spoken utterance including the hotword "OK Assistant", that the hotword detection model is trained to generate the predicted output at block 354 that indicates a probability, but that the probability (e.g., 0.80) fails to satisfy a threshold probability (e.g., 0.85) at block 356. In one instance, assume that the further user interface input is additional audio data that captures a subsequent spoken utterance including the hotword "OK Assistant" that contradicts the initial decision made at block 356, the initial decision made at block 356 can be classified as incorrect (i.e., a false negative) based on, for example, determining a time duration between the spoken utterance and the additional spoken utterance satisfies a time threshold (e.g., within 3.0 seconds), a measure of similarity between the spoken utterance and the additional spoken utterance satisfies a similarity threshold (e.g., voice similarity of voice characteristics, textual similarity of recognized text, and/or other similarity determinations), a magnitude of the initial probability satisfies a probabilistic threshold with respect to the threshold probability (e.g., within 0.20 of 0.85), a function of the time duration and the initial probability for the initial decision at block 356 as described herein, and/or other determinations. In another instance, assume that the further user interface input is an alternate invocation of the assistant, such as actuation of an explicit automated assistant invocation button (e.g., a hardware button or software button), a sensed "squeeze" of a device (e.g., when squeezing the device with at least a threshold amount of force invokes the assistant), and/or other explicit assistant invocation(s) that contradicts the initial decision made at block 356, the initial decision made at block 356 can be classified as incorrect (i.e., a false negative) based on, for example, determining a time duration between the spoken utterance and the alternate invocation satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 356 as described herein, and/or other determinations. Accordingly, in these instances, the system can initiate currently dormant automated assistant function(s) based on determining the initial decision made at block 356 was incorrect.

With respect to a hotword free invocation model (e.g., hotword free invocation model 152C of FIG. 1C), assume that the received sensor data is a directed gaze, mouth movement, and/or other utterance free physical movement(s) that serve as a proxy for the hotword, that the hotword free invocation model is trained to generate the predicted output at block 354 that indicates a probability, but that the probability (e.g., 0.80) fails to satisfy a threshold probability (e.g., 0.85) at block 356. In one instance, assume that the further user interface input is audio data that captures a spoken utterance, including the hotword "OK Assistant" that contradicts the initial decision made at block 356, the initial decision made at block 356 can be classified as incorrect (i.e., a false negative) based on, for example, determining a time duration between the directed gaze, mouth movement, and/or other utterance free physical movement(s) that serve as a proxy for the hotword and the spoken utterance satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 356 as described herein, and/or other determinations. In another instance, assume that the further user interface input is an alternate invocation of the assistant, such as actuation of an explicit automated assistant invocation button (e.g., a hardware button or software button), a sensed "squeeze" of a device (e.g., when squeezing the device with at least a threshold amount of force invokes the assistant), and/or other explicit assistant invocation(s) that contradicts the initial decision made at block 356, the initial decision made at block 356 can be classified as incorrect (i.e., a false negative) based on, for example, determining a time duration between the directed gaze, mouth movement, and/or other utterance free physical movement(s) that serve as a proxy for the hotword and the alternate invocation satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 356 as described herein, and/or other determinations. Accordingly, in these instances, the system can initiate currently dormant automated assistant function(s) based on determining the initial decision made at block 356 was incorrect.

With respect to a continued conversation model (e.g., continued conversation model of FIG. 1D), assume that the received sensor data is a subsequent audio data that captures a subsequent spoken utterance when the assistant is already invoked and certain automated assistant function(s) are active, that the continued conversation model is trained to generate the predicted output at block 354 that indicates a probability, but that the probability (e.g., 0.80) fails to satisfy a threshold probability (e.g., 0.85) at block 356. In one instance, assume that the further user interface input is additional audio data that captures an additional spoken utterance (i.e., repeating the subsequent spoken utterance) that contradicts the initial decision made at block 356, the initial decision made at block 356 can be classified as incorrect (i.e., a false negative) based on, for example, determining a time duration between the subsequent spoken utterance and the additional spoken utterance satisfies a time threshold (e.g., within 3.0 seconds), a measure of similarity between the subsequent spoken utterance and the additional spoken utterance satisfies a similarity threshold (e.g., voice similarity of voice characteristics, textual similarity of recognized text, durational similarity between the subsequent spoken utterance and the additional spoken utterance, and/or other similarity determinations), a magnitude of the initial probability satisfies a probabilistic threshold with respect to the threshold probability (e.g., within 0.20 of 0.85), a function of the time duration and the initial probability for the initial decision at block 356 as described herein, and/or other determinations. In another instance, assume that the further user interface input is an alternate invocation of the assistant, such as actuation of an explicit automated assistant invocation button (e.g., a hardware button or software button), a sensed "squeeze" of a device (e.g., when squeezing the device with at least a threshold amount of force invokes the assistant), and/or other explicit assistant invocation(s) that contradicts the initial decision made at block 356, the initial decision made at block 356 can be classified as incorrect (i.e., a false negative) based on, for example, determining a time duration between the subsequent spoken utterance and the alternate invocation satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 356 as described herein, and/or other determinations. Accordingly, in these instances, the system can refrain from shutting down currently active automated assistant function(s) (i.e., because the assistant is already invoked) and/or initiate further currently dormant automated assistant function(s) based on determining the initial decision made at block 356 was incorrect.

Further, if, at an iteration of block 366, the system determines the further user interface input received at block 362 indicates a correction to the decision made at block 356, the system provides the predicted output generated at block 354 to block 368.

At block 368, the system generates a gradient based on comparing the predicted output to ground truth output that satisfies the threshold. In some implementations, the ground truth output corresponds to output that satisfies the threshold at block 356 and is generated based on determining, at block 366, the further user interface input received at block 362 indicating a correction of the decision made at block 356. For example, for a false negative, if the generated predicted output is 0.82 and the threshold is 0.85, then the system can generate the ground truth output of 1.0. In such an example, generating the gradient is based on comparing the predicted output of 0.82 to the ground truth output of 0.1.

At block 370, the system updates one or more weights of the on-device machine learning model based on the generated gradient and/or the system transmits (e.g., via the Internet or other wide area network) the generated gradient to a remote system (without transmitting any of the audio data, the sensor data, and/or the further user interface input). When the gradient is transmitted to the remote system, the remote system utilizes the generated gradient, and additional gradients from additional client devices, to update global weights of a global speech recognition model. After block 370, the system then proceeds back to block 352.

Figure 4:
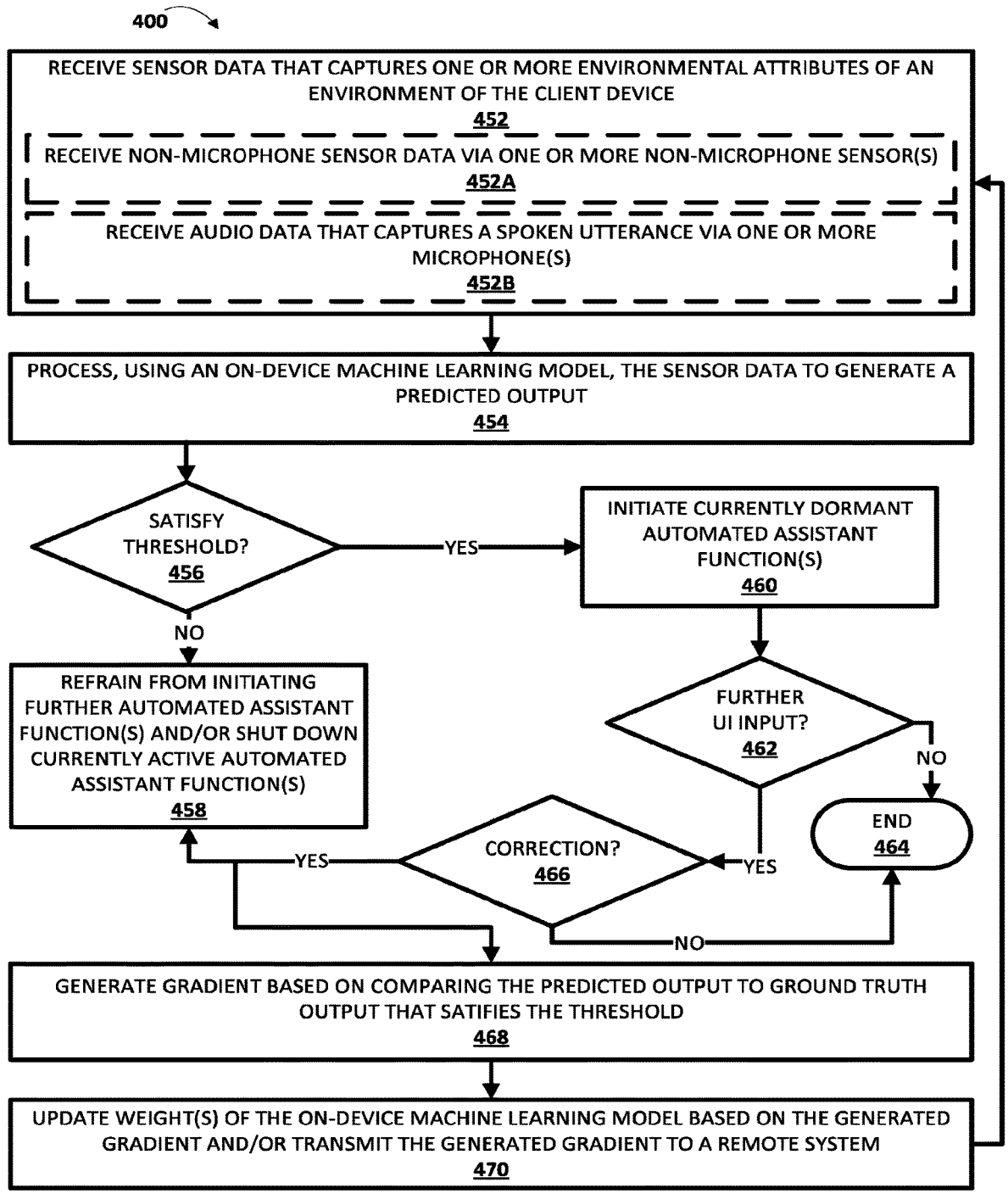
FIG. 4 depicts a flowchart illustrating an example method of generating a gradient, locally at a client device, based on a false positive, and transmitting the gradient to a remote server and/or utilizing the generated gradient to update weight(s) of an on-device speech recognition model.

FIG. 4 depicts a flowchart illustrating an example method 400 of generating a gradient, locally at a client device, based on a false positive, and transmitting the gradient and/or utilizing the generated gradient to update weight(s) of an on-device speech recognition model. For convenience, the operations of the method 400 are described with reference to a system that performs the operations. This system of method 400 includes one or more processors and/or other component(s) of a client device. Moreover, while operations of the method 400 are shown in a particular order, this is not meant to be limiting. One or more operations may be reordered, omitted, or added.

At block 452, the system receives sensor data that captures one or more environmental attributes of an environment of the client device. In some implementations, as indicated by optional block 452A, the sensor data is non-microphone sensor data received via non-microphone sensors. In some versions of those implementations, the sensor data includes one or more images from a camera of one or more sensor components, proximity sensor data from a proximity sensor of the one or more sensor components, accelerometer data from an accelerometer of the one or more sensor components, and/or magnetometer data from a magnetometer of the one or more sensor components. In some implementations, as indicated by optional block 452B, the sensor data is audio data that captures a spoken utterance and is received via one or more microphones.

At block 454, the system processes, using an on-device machine learning model, the sensor data to generate a predicted output. The on-device machine learning model can be, for example, a hotword detection model, a continued conversation model, a hotword free invocation model, and/or other machine learning models. Further, the generated output can be, for example, a probability and/or other likelihood measures.

At block 456, the system determines whether the predicted output generated at block 454 satisfies a threshold. If, at an iteration of block 356, the system determines the predicted output generated at block 354 fails to satisfy a threshold, then the system proceeds to block 458 and refrains from initiating one or more currently dormant automated assistant functions and/or shuts down one or more currently active automated assistant functions. In some implementations, the one or more automated assistant functions include speech recognition to generate recognized text, natural language understanding (NLU) to generate NLU output, generating a response based on the recognized text and/or the NLU output, transmission of the audio data to a remote server, and/or transmission of the recognized text to the remote server. For example, assume the predicted output, generated at block 454, is a probability and the probability must be greater than 0.85 to activate one or more currently dormant automated assistant functions, but the predicted probability is only 0.82. Based on the predicted probability of 0.82 failing to satisfy the threshold of 0.85, the system proceeds to block 458 and refrains from initiating the one or more currently dormant automated assistant functions and/or shuts down one or more currently active automated assistant functions.

If, at an iteration of block 456, the system determines the predicted output generated at block 454 satisfies a threshold, then the system proceeds to block 460 and initiates one or more currently dormant automated assistant functions. For example, assume the predicted output, generated at block 454, is a probability and the probability must be greater than 0.85 to activate one or more currently dormant automated assistant functions, and the predicted probability is 0.88. Based on the predicted probability of 0.88 satisfying the threshold of 0.85, the system proceeds to block 460 and initiates the one or more currently dormant automated assistant functions as the user intended. However, the system can perform further processing to determine whether the system should have refrained from initiating the one or more currently dormant automated assistant functions and/or should have shut down the one or more currently active automated assistant functions in response to receiving the sensor despite the generated predicted output satisfying the threshold.

At block 462, the system determines whether further user interface input is received. In some implementations, the further user interface input is further non-microphone sensor data received via the non-microphone sensors. In some versions of those implementations, the further non-microphone sensor data includes one or more images from a camera of one or more sensor components, proximity sensor data from a proximity sensor of the one or more sensor components, accelerometer data from an accelerometer of the one or more sensor components, and/or magnetometer data from a magnetometer of the one or more sensor components. In some implementations, the further user interface input is further audio data that captures a subsequent spoken utterance and is received via the one or more microphones. In some versions of those implementations, the subsequent spoken utterance repeats at least a portion of the spoken utterance received at optional block 452B. In other versions of those implementations, the subsequent spoken utterance is not related to the spoken utterance received at optional block 452B. If, at an iteration of block 462, the system determines there is no further user interface input, then the system proceeds to block 464 and the method 400 ends. If, at an iteration of block 462, the system determines there is further user interface input received at the client device, then the system proceeds to block 466.

At block 466, the system determines whether the further user interface input received at block 462 indicates a correction of the decision made at block 456. If, at an iteration of block 466, the system determines the further user interface input received at block 462 does not indicate a correction of the decision made at block 456, then the system proceeds to block 464 and the method 400 ends. If, at an iteration of block 466, the system determines the further user interface input received at block 462 indicates correction of the decision made at block 456, then the system returns to block 458 and refrains from initiating the one or more currently dormant automated assistant functions and/or shuts down one or more currently active automated assistant functions. Accordingly, when it is determined there is a correction at block 466, the incorrect decision made at block 456 can be classified as an occurrence of a false positive.

With respect to a hotword detection model (e.g., hotword detection model 152B of FIG. 1B), assume that the received sensor data is audio data that captures a spoken utterance that includes "display consistent" as opposed to the hotword "OK Assistant", that the hotword detection model is trained to generate the predicted output at block 454 that indicates a probability, and that the probability (e.g., 0.90) satisfies a threshold probability (e.g., 0.85) at block 456. In one instance, assume that the further user interface input is additional audio data that captures a subsequent spoken utterance including "No", "Stop", "Cancel", and/or another spoken utterance that contradicts the initial decision made at block 456, the initial decision made at block 456 can be classified as incorrect (i.e., a false positive) based on, for example, determining a time duration between the spoken utterance and the additional spoken utterance satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 456 as described herein, and/or other determinations. In another instance, assume that the further user interface input is alternate input cancelling invocation of the assistant, such as actuation of an explicit automated assistant invocation button (e.g., a hardware button or software button), a sensed "squeeze" of a device (e.g., when squeezing the device with at least a threshold amount of force invokes the assistant), and/or other explicit input cancelling invocation of the assistant, the initial decision made at block 456 can be classified as incorrect (i.e., a false positive) based on, for example, determining a time duration between the spoken utterance and the alternate input cancelling invocation satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 456 as described herein, and/or other determinations. Accordingly, in these instances, the system can refrain from initiating currently dormant automated assistant function(s) and/or shut down currently active automated assistant function(s) based on determining the initial decision made at block 456 was incorrect.

With respect to a hotword free invocation model (e.g., hotword free invocation model 152C of FIG. 1C), assume that the received sensor data is a directed gaze, mouth movement, and/or other utterance free physical movement(s) that serve as a proxy for the hotword, that the hotword free invocation model is trained to generate the predicted output at block 454 that indicates a probability, and that the probability (e.g., 0.90) satisfies a threshold probability (e.g., 0.85) at block 456. In one instance, assume that the further user interface input is audio data that captures a spoken utterance, including "No", "Stop", "Cancel", and/or another spoken utterance that contradicts the initial decision made at block 456, the initial decision made at block 456 can be classified as incorrect (i.e., a false positive) based on, for example, determining a duration of time between the directed gaze, mouth movement, and/or other utterance free physical movement(s) that serve as a proxy for the hotword and the spoken utterance satisfies a time threshold (e.g., within 3.0 seconds), a magnitude of the initial probability satisfies a probabilistic threshold with respect to the threshold probability (e.g., within 0.20 of 0.85), and/or other determinations. In another instance, assume that the further user interface input is further sensor data negating the directed gaze and/or alternate input cancelling invocation of the assistant, such as actuation of an explicit automated assistant invocation button (e.g., a hardware button or software button), a sensed "squeeze" of a device (e.g., when squeezing the device with at least a threshold amount of force invokes the assistant), and/or other explicit input cancelling invocation of the assistant, the initial decision made at block 456 can be classified as incorrect (i.e., a false positive) based on, for example, determining a time duration between the directed gaze, mouth movement, and/or other utterance free physical movement(s) that serve as a proxy for the hotword and the alternate input cancelling invocation of the assistant satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 456 as described herein, and/or other determinations. Accordingly, in these instances, the system can refrain from initiating currently dormant automated assistant function(s) and/or shut down currently active automated assistant function(s) based on determining the initial decision made at block 456 was incorrect.

With respect to a continued conversation model (e.g., continued conversation model of FIG. 1D), assume that the received sensor data is a subsequent audio data that captures a subsequent spoken utterance when the assistant is already invoked and certain automated assistant function(s) are active, that the continued conversation model is trained to generate the predicted output at block 454 that indicates a probability, and that the probability (e.g., 0.90) satisfies a threshold probability (e.g., 0.85) at block 456. In one instance, assume that the further user interface input is additional audio data that captures an additional spoken utterance, including "No", "Stop", "Cancel", and/or another spoken utterance that contradicts the initial decision made at block 456, the initial decision made at block 456 can be classified as incorrect (i.e., a false positive) based on, for example, determining a time duration between the subsequent spoken utterance and the additional spoken utterance satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 456 as described herein, and/or other determinations. In another instance, assume that the further user interface input is alternate input cancelling the invocation of the assistant, such as actuation of an explicit automated assistant invocation button (e.g., a hardware button or software button), a sensed "squeeze" of a device (e.g., when squeezing the device with at least a threshold amount of force invokes the assistant), and/or other explicit input cancelling invocation of the assistant, the initial decision made at block 456 can be classified as incorrect (i.e., a false positive) based on, for example, determining a time duration between the subsequent spoken utterance and the alternate invocation satisfies a time threshold (e.g., within 3.0 seconds), a magnitude of the initial probability satisfies a probabilistic threshold with respect to the threshold probability (e.g., within 0.20 of 0.85), a function of the time duration and the initial probability for the initial decision at block 456 as described herein, and/or other determinations. Accordingly, in these instances, the system can shut down currently active automated assistant function(s) (i.e., because the assistant is already invoked) and/or refrain from initiating currently dormant automated assistant function(s) based on determining the initial decision made at block 456 was incorrect.

Further, if, at an iteration of block 466, the system determines the further user interface input received at block 462 indicates a correction to the decision made at block 456, the system provides the predicted output generated at block 454 to block 468.

At block 468, the system generates a gradient based on comparing the predicted output to ground truth output that satisfies the threshold. In some implementations, the ground truth output corresponds to output that fails to satisfy the threshold at block 456 and is generated based on determining, at block 466, the further user interface input received at block 462 indicating a correction of the decision made at block 456. For example, for a false positive, if the generated predicted output is 0.88 and the threshold is 0.85, then the system can generate the ground truth output of 0.0. In such an example, generating the gradient is based on comparing the predicted output of 0.88 to the ground truth output of 0.0.

At block 470, the system updates one or more weights of the on-device machine learning model based on the generated gradient and/or the system transmits (e.g., via the Internet or other wide area network) the generated gradient to a remote system (without transmitting any of the audio data, the sensor data, and/or the further user interface input). When the gradient is transmitted to the remote system, the remote system utilizes the generated gradient, and additional gradients from additional client devices, to update global weights of a global speech recognition model. After block 470, the system then proceeds back to block 452.

It is noted that, in various implementations of methods 300 and 400, the audio data, the predicted output, the further user interface input, and/or the ground truth output can be stored locally on the client device. Further, in some versions of those implementations of methods 300 and 400, generating the gradient, updating the one or more weights of the on-device machine learning model, and/or transmitting the gradient to the remote system are performed responsive to determining that a current state of the client device satisfies one or more conditions. For example, the one or more conditions include the client device is charging, the client device has at least a threshold state of charge, and/or the client device is not being carried by a user. Moreover, in some additional or alternative versions of those implementations of methods 300 and 400, generating the gradient, updating the one or more weights of the on-device machine learning model, and/or transmitting the gradient to the remote system are performed in real-time. In these and other manners, the on-device machine learning model can be adapted quickly to mitigate the occurrence of false negatives and/or false positives. Further, this enables improved performance of the on-device machine learning model for attribute(s) of user(s) of the client device, such as tone, intonation, accent, and/or other speech characteristic(s) in the case of on-device machine learning model(s) that process audio data capturing spoken utterances.

Figure 5:
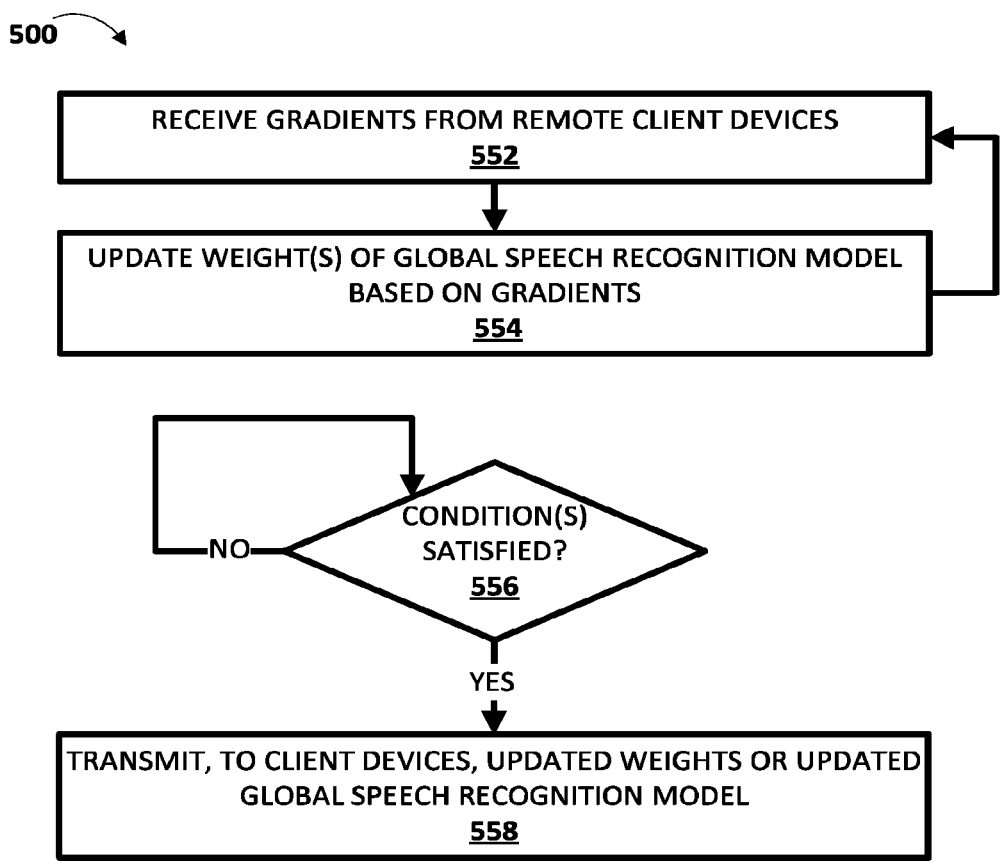
FIG. 5 depicts a flowchart illustrating an example method of updating weight(s) of a global speech recognition model based on gradients received from remote client devices, and transmitting, to remote client devices, the updated weights or the updated global speech recognition model.

FIG. 5 depicts a flowchart illustrating an example method 500 of updating weight(s) of a global speech recognition model based on gradients received from remote client devices, and transmitting, to remote client devices, the updated weights or the updated global speech recognition model. For convenience, the operations of the method 500 are described with reference to a system that performs the operations. This system may include various components of various computer systems, such as one or more server devices. Moreover, while operations of the method 500 are shown in a particular order, this is not meant to be limiting. One or more operations may be reordered, omitted, or added.

At block 552, the system receives gradients from remote client devices. For example, the system can receive gradients from a plurality of client devices that are performing corresponding instances of method 300 of FIG. 3 and/or instances of method 400 of FIG. 4.

At block 554, the system updates weight(s) of a global speech recognition model based on the gradients received at block 552. Iterations of blocks 552 and 554 can continue to be performed as new gradients are received and/or are queued after being received.

At block 556, the system at least periodically determines whether one or more conditions are satisfied, such as one or more of the conditions described herein. Generally, the condition(s) serve as a proxy for determining whether the global model has been updated to an extent that justifies utilization of network resources in transmitting updated weights for the model and/or the updated model itself. In other words, the condition(s) are used as proxy for determining if the performance gains of the model justify the usage of network resources. If so, the system proceeds to block 558 and transmits, to a plurality of client devices, current updated weights and/or a current updated global speech recognition model. The updated weights and/or global speech recognition model can optionally be transmitted to a given client device responsive to a request from the given client device, such as a request during an update procedure and/or a request sent due to the client device being idle and/or charging.

Figure 6:
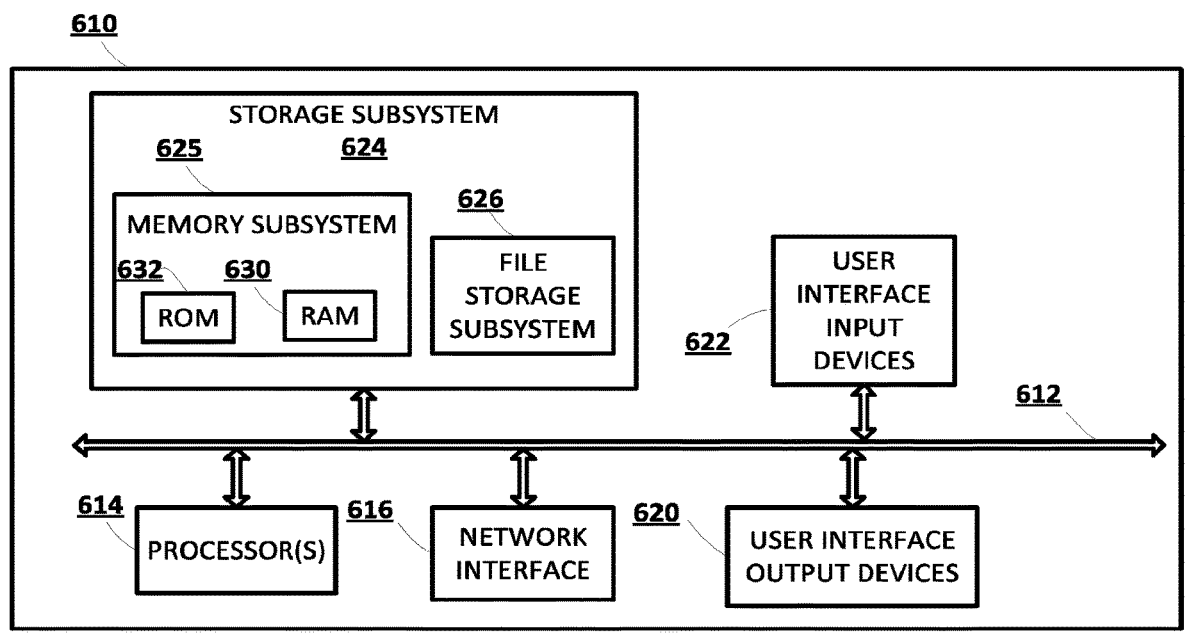
FIG. 6 depicts an example architecture of a computing device.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1A and 1B.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a client device is provided and includes receiving, via one or more microphones of the client device, audio data that captures a spoken utterance of a user. The method further includes processing the audio data using a machine learning model, stored locally at the client device, to generate a predicted output. The method further includes making a decision, based on the predicted output failing to satisfy a threshold, to refrain from initiating one or more currently dormant automated assistant functions. The method further includes subsequent to making the decision to refrain from initiating the one or more currently dormant automated assistant functions, determining, based on further user interface input received at the client device subsequent to receiving the audio data, that the decision was incorrect. The method further includes, in response to determining that the decision was incorrect, generating a gradient based on comparing the predicted output to ground truth output that satisfies the threshold, and updating one or more weights of the machine learning model based on the generated gradient.

These and other implementations of the technology can include one or more of the following features.

In some implementations, determining that the decision was incorrect is further based on a magnitude of the predicted output. In some versions of those implementations, determining that the decision was incorrect further based on the magnitude of the predicted output includes determining that the predicted output, while failing to satisfy the threshold for initiating the one or more currently dormant automated assistant functions, is within a threshold range of the threshold.

In some implementations, determining, based on the further user interface input received at the client device subsequent to receiving the audio data, that the decision was incorrect is based on a duration of time between receiving the audio data and receiving the further user interface input.

In some implementations, the further user interface input is an additional spoken utterance captured in additional audio data. In some versions of those implementations, the method further includes processing the additional audio data, using the machine learning model, to generate an additional predicted output, and making an additional decision, based on the additional predicted output satisfying the threshold, to initiate the one or more currently dormant automated assistant functions. Determining, based on the further user interface input received at the client device subsequent to receiving the audio data, that the decision was incorrect includes determining that the decision was incorrect based on the additional decision to initiate the one or more currently dormant automated assistant functions.

In some implementations, the further user interface input is an additional spoken utterance captured in additional audio data. In some versions of those implementations, the method further includes determining one or more measures of similarity between the spoken utterance and the additional spoken utterance. Determining, based on the further user interface input received at the client device subsequent to receiving the audio data, that the decision was incorrect is based on the one or more measures of similarity between the spoken utterance and the additional spoken utterance. In some further versions of those implementations, the one or more measures of similarity include duration similarity based on comparison of durations of the spoken utterance and the additional spoken utterance, voice similarity based on comparison of voice characteristics of the spoken utterance and the additional spoken utterance, and/or text similarity based on comparison of recognized text of the spoken utterance and the additional spoken utterance.

In some implementations, the further user interface input is an additional spoken utterance captured in additional audio data. In some further versions of those implementations, determining, based on the further user interface input received at the client device subsequent to receiving the audio data, that the decision was incorrect, includes determining that the decision was incorrect based on: one or more acoustic features of the additional spoken utterance, or text recognized from the additional spoken utterance using a speech recognition model stored locally at the client device.

In some implementations, determining that the decision was incorrect includes determining a confidence measure that indicates confidence that the decision was incorrect. In some versions of those implementations, the method further includes determining a magnitude of the ground truth output, that satisfies the threshold, based on the confidence measure.

In some implementations, the one or more currently dormant automated assistant functions include speech recognition, natural language understanding (NLU), transmission of the audio data or subsequent audio data to a remote server, transmission of recognized text, from the speech recognition, to a remote server, and/or generating a response based on the recognized text and/or NLU output from the NLU.

In some implementations, the machine learning model is a hotword detection model. In some versions of those implementations, the one or more currently dormant automated assistant functions include speech recognition using a speech recognition model stored locally at the client device, transmission of the audio data to a remote server, transmission of recognized text, from the speech recognition, to the remote server, and/or natural language understanding, of the recognized text, using a natural language understanding model stored locally at the client device.

In some implementations, the machine learning model is a continued conversation model. In some versions of those implementations, the one or more currently dormant automated assistant functions include transmission of the audio data to a remote server, transmission of recognized text, from local speech recognition of the audio data, to the remote server, and/or generating a response based on the audio data or the recognized text. In some further versions of those implementations, the predicted output is further based on processing, using the machine learning model, the recognized text and/or natural language understanding data generated based on the recognized text.

In some implementations, the method further includes transmitting, over a network to a remote system, the generated gradient without transmitting any of: the audio data and the further user interface input. The remote system utilizes the generated gradient, and additional gradients from additional client devices, to update global weights of a global machine learning model that corresponds to the machine learning model. In some versions of those implementations, the updated global weights of the global speech recognition model are stored in memory of the remote system. In some versions of those implementations, the method further includes receiving, at the client device and from the remote system, the global machine learning model. Receiving the global machine learning model is subsequent to the remote system updating the global weights of the global machine learning model based on the generated gradient and the additional gradients. In some versions of those implementations, the method further includes responsive to receiving the global machine learning model, replacing, in local storage of the client device, the machine learning model with the global machine learning model. In some versions of those implementations, the method further includes receiving, at the client device and from the remote system, the updated global weights. Receiving the updated global weights is subsequent to the remote system updating the global weights of the global machine learning model based on the generated gradient and the additional gradients. In some versions of those implementations, the method further includes responsive to receiving the updated global weights, replacing, in local storage of the client device, weights of the machine learning model with the updated global weights.

In some implementations, the method further includes determining, based on sensor data from one or more sensors of the client device, that a current state of the client device satisfies one or more conditions. Generating the gradient and/or updating the one or more weights are performed responsive to determining that the current state of the client device satisfies the one or more conditions.

In some implementations, a method performed by one or more processors of a client device is provided and includes receiving, via one or more sensor components of the client device, sensor data that captures one or more environmental attributes of an environment of the client device. The method further includes processing the sensor data using a machine learning model, stored locally at the client device, to generate a predicted output that dictates whether one or more currently dormant automated assistant functions are activated. The method further includes making a decision, based on the predicted output failing to satisfy a threshold, as to whether to trigger the one or more currently dormant automated assistant functions. The method further includes, subsequent to making the decision, determining that the decision was incorrect. The method further includes, in response to determining that the determination was incorrect, generating a gradient based on comparing the predicted output to ground truth output that satisfies the threshold, and updating one or more weights of the machine learning model based on the generated gradient.

These and other implementations of the technology can include one or more of the following features.

In some implementations, the machine learning model is a hotword free invocation model. In some versions of those implementations, the sensor data includes one or more images from a camera of the one or more sensor components, proximity sensor data from a proximity sensor of the one or more sensor components, accelerometer data from an accelerometer of the one or more sensor components, and/or magnetometer data from a magnetometer of the one or more sensor components.

In some implementations, the one or more currently dormant automated assistant functions include speech recognition using a speech recognition model stored locally at the client device, transmission of the audio data to a remote server, transmission of recognized text, from the speech recognition, to the remote server, and/or natural language understanding, of the recognized text, using a natural language understanding model stored locally at the client device.

In some implementations, determining that the decision was incorrect includes receiving additional user interface input at the client device and subsequent to receiving the sensor data, and determining that the additional user interface input indicates a correction of the decision. Determining that the decision was incorrect is based on determining that the additional user interface input indicates the correction of the decision.

In some implementations, determining that the additional user interface input indicates the correction of the determination is based on a duration of time between receiving the sensor data and receiving the additional user interface input. In some versions of those implementations, the sensor data includes audio data that captures a spoken utterance, and the additional user interface input is an additional spoken utterance captured in additional audio data. In some further versions of those implementations, the method further includes determining, based on the audio data and the additional audio data, one or more measures of similarity between the spoken utterance and the additional spoken utterance. Determining that the additional user interface input indicates the correction of the determination is based on the one or more measures of similarity. In some versions of those implementations, the additional user interface input is additional audio data, and determining that the additional user interface input indicates the correction of the decision is based on one or more acoustic features of the additional audio data, and/or text recognized from the additional audio data using a speech recognition model stored locally at the client device.

In some implementations, determining that the decision was incorrect is further based on a magnitude of the predicted output.

In some implementations, the decision is to not trigger the one or more currently dormant automated assistant functions. In some versions of those implementations, determining that the decision was incorrect is based on processing the additional user interface input, using the machine learning model, to generate an additional predicted output, and determining, based on the additional predicted output, to trigger the one or more currently dormant automated assistant functions.

In some implementations, the decision is to trigger the one or more currently dormant automated assistant functions. In some versions of those implementations, the triggered one or more currently dormant automated assistant functions include transmission of the audio data to a remote server. In some further versions of those implementations, determining that the decision was incorrect includes receiving, from the remote server responsive to the transmitting, an indication that the determination was incorrect.

In some implementations, a method performed by one or more processors of a client device is provided and includes receiving, via one or more microphones of the client device, audio data that captures a spoken utterance of a user. The method further includes processing the audio data using a machine learning model, stored locally at the client device, to generate a predicted output. The method further includes making a decision, based on the predicted output failing to satisfy a threshold, to refrain from initiating one or more currently dormant automated assistant functions. The method further includes, subsequent to making the decision to refrain from initiating the one or more currently dormant automated assistant functions, determining, based on further user interface input received at the client device subsequent to receiving the audio data, that the decision was incorrect. The method further includes, in response to determining that the decision was incorrect, generating a gradient based on comparing the predicted output to ground truth output that satisfies the threshold, and transmitting, over a network to a remote system, the generated gradient without transmitting the audio data and/or the further user interface input. The remote system utilizes the generated gradient, and additional gradients from additional client devices, to update global weights of a global speech recognition model.

These and other implementations of the technology can include one or more of the following features.

In some implementations, the updated global weights of the global speech recognition model are stored in memory of the remote system.

In some implementations, the method further includes receiving, at the client device and from the remote system, the global speech recognition model. Receiving the global speech recognition model is subsequent to the remote system updating the global weights of the global speech recognition model based on the generated gradient and the additional gradients. In some implementations, the method further includes, responsive to receiving the global speech recognition model, replacing, in local storage of the client device, the speech recognition model with the global speech recognition model.

In some implementations, the method further includes receiving, at the client device and from the remote system, the updated global weights. Receiving the updated global weights is subsequent to the remote system updating the global weights of the global end-to-end speech recognition model based on the gradient and the additional gradients. In some implementations, the method further includes, responsive to receiving the updated global weights, replacing in local storage of the client device weights of the speech recognition model with the updated global weights.

In some implementations, a method performed by one or more processors of a client device is provided and includes receiving, via one or more sensor components of the client device, sensor data that captures one or more environmental attributes of an environment of the client device. The method further includes processing the sensor data using a machine learning model, stored locally at the client device, to generate a predicted output that dictates whether one or more currently dormant automated assistant functions are activated. The method further includes making a decision, based on the predicted output failing to satisfy a threshold, as to whether to trigger the one or more currently dormant automated assistant functions. The method further includes, subsequent to making the decision, determining that the decision was incorrect. The method further includes, in response to determining that the determination was incorrect, generating a gradient based on comparing the predicted output to ground truth output that satisfies the threshold, and transmitting, over a network to a remote system, the generated gradient without transmitting the audio data and/or the further user interface input. The remote system utilizes the generated gradient, and additional gradients from additional client devices, to update global weights of a global speech recognition model.

These and other implementations of the technology can include one or more of the following features.

In some implementations, the updated global weights of the global speech recognition model are stored in memory of the remote system.

In some implementations, the method further includes receiving, at the client device and from the remote system, the global speech recognition model. Receiving the global speech recognition model is subsequent to the remote system updating the global weights of the global speech recognition model based on the generated gradient and the additional gradients. In some implementations, the method further includes, responsive to receiving the global speech recognition model, replacing, in local storage of the client device, the speech recognition model with the global speech recognition model.

In some implementations, the method further includes receiving, at the client device and from the remote system, the updated global weights. Receiving the updated global weights is subsequent to the remote system updating the global weights of the global end-to-end speech recognition model based on the gradient and the additional gradients. In some implementations, the method further includes, responsive to receiving the updated global weights, replacing in local storage of the client device weights of the speech recognition model with the updated global weights.

What is claimed is:

1. A method performed by one or more processors of a client device, the method comprising:
    receiving, via one or more microphones of the client device, audio data that captures a spoken utterance of a user;
    processing the audio data using a machine learning model, stored locally at the client device, to generate a predicted output;
    making a decision, based on the predicted output failing to satisfy a threshold, to refrain from initiating one or more currently dormant automated assistant functions;

subsequent to making the decision to refrain from initiating the one or more currently dormant automated assistant functions:
receiving, via the client device, further user interface input to initiate one or more of the one or more currently dormant automated assistant functions and that contradicts the decision to refrain from initiating one or more of the one or more currently dormant automated assistant functions; and
determining, based on a duration of time between receiving the audio data that was processed in making the decision and receiving the further user interface input that contradicts the decision, that the decision to refrain from initiating one or more of the one or more currently dormant automated assistant functions was incorrect; and
in response to determining that the decision was incorrect:
generating a gradient based on comparing the predicted output to ground truth output that satisfies the threshold, and
transmitting, over a network and to a remote system, the generated gradient without transmitting any of: the audio data and the further user interface input, wherein the remote system utilizes the generated gradient, and additional gradients from additional client devices, to update global weights of a global machine learning model that is a global counterpart of the machine learning model that is stored locally at the client device.

2. The method of claim 1, wherein determining that the decision was incorrect is further based on a magnitude of the predicted output.

3. The method of claim 2, wherein determining that the decision was incorrect further based on the magnitude of the predicted output comprises determining that the predicted output, while failing to satisfy the threshold for initiating the one or more currently dormant automated assistant functions, is within a threshold range of the threshold.

4. The method of claim 1, wherein the further user interface input is an additional spoken utterance captured in additional audio data, and further comprising:
processing the additional audio data, using the machine learning model, to generate an additional predicted output; and
making an additional decision, based on the additional predicted output satisfying the threshold, to initiate the one or more currently dormant automated assistant functions;
wherein determining, based on the further user interface input received at the client device subsequent to receiving the audio data, that the decision was incorrect, comprises:
determining that the decision was incorrect based on the additional decision to initiate the one or more currently dormant automated assistant functions.

5. The method of claim 1, wherein the further user interface input is an additional spoken utterance captured in additional audio data, and further comprising:
determining one or more measures of similarity between the spoken utterance and the additional spoken utterance;
wherein determining, based on the further user interface input received at the client device subsequent to receiving the audio data, that the decision was incorrect is based on the one or more measures of similarity between the spoken utterance and the additional spoken utterance.

6. The method of claim 5, wherein the one or more measures of similarity comprise one or more of:
duration similarity based on comparison of durations of the spoken utterance and the additional spoken utterance,
voice similarity based on comparison of voice characteristics of the spoken utterance and the additional spoken utterance, or
text similarity based on comparison of recognized text of the spoken utterance and the additional spoken utterance.

7. The method of claim 1, wherein the further user interface input is an additional spoken utterance captured in additional audio data, and wherein determining, based on the further user interface input received at the client device subsequent to receiving the audio data, that the decision was incorrect, comprises:
determining that the decision was incorrect based on:
one or more acoustic features of the additional spoken utterance, or
text recognized from the additional spoken utterance using a speech recognition model stored locally at the client device.

8. The method of claim 1, wherein the one or more currently dormant automated assistant functions comprise one or more of:
activation of speech recognition,
activation of natural language understanding (NLU),
transmission of the audio data or subsequent audio data to a remote server,
transmission of recognized text, from the speech recognition, to a remote server, or
generation of a response based on the recognized text or NLU output from the NLU.

9. The method of claim 1, wherein the machine learning model is a hotword detection model, and wherein the one or more currently dormant automated assistant functions comprise one or more of:
activation of speech recognition using a speech recognition model stored locally at the client device,
transmission of the audio data to a remote server,
transmission of recognized text, from the speech recognition, to the remote server, or
activation of natural language understanding, of the recognized text, using a natural language understanding model stored locally at the client device.

10. The method of claim 1, wherein the machine learning model is a continued conversation model, and wherein the one or more currently dormant automated assistant functions comprise one or more of:
transmission of the audio data to a remote server,
transmission of recognized text, from local speech recognition of the audio data, to the remote server, or
generation of a response based on the audio data or the recognized text.

11. The method of claim 1, further comprising:
receiving, at the client device and from the remote system, the updated global weights, wherein receiving the updated global weights is subsequent to the remote system updating the global weights of the global machine learning model based on the generated gradient and the additional gradients; and
responsive to receiving the updated global weights, replacing, in local storage of the client device, weights of the machine learning model with the updated global weights.

12. The method of claim 1, further comprising:
receiving, at the client device and from the remote system, the updated global machine learning model, wherein receiving the updated global machine learning model is subsequent to the remote system updating the global weights of the global machine learning model based on the gradient and the additional gradients; and
responsive to receiving the updated global machine learning model, replacing in local storage of the client device, the machine learning model with the updated global machine learning model.

13. The method of claim 1, further comprising:
determining, based on sensor data from one or more sensors of the client device, that a current state of the client device satisfies one or more conditions,
wherein generating the gradient is performed responsive to determining that the current state of the client device satisfies the one or more conditions.

14. The method of claim 1, wherein the machine learning model is a speech recognition model, and wherein the one or more currently dormant automated assistant functions comprise one or more of:
performance of speech recognition using the speech recognition model stored locally at the client device,
transmission of the audio data to a remote server,
transmission of recognized text, from the speech recognition model, to the remote server.

15. The method of claim 1, wherein the updated global weights of the global machine learning model are stored in memory of the remote system.

16. A method performed by one or more processors of a client device, the method comprising:
receiving, via one or more sensor components of the client device, sensor data that captures one or more environmental attributes of an environment of the client device;
processing the sensor data using a machine learning model, stored locally at the client device, to generate a predicted output that dictates whether one or more currently dormant automated assistant functions are activated;
making a decision, based on the predicted output failing to satisfy a threshold, as to whether to trigger the one or more currently dormant automated assistant functions;
subsequent to making the decision:
receiving, via the client device, further user interface input to initiate one or more of the one or more currently dormant automated assistant functions and that contradicts the decision to refrain from initiating one or more of the one or more currently dormant automated assistant functions; and
determining, based on a duration of time between receiving the sensor data that was processed in making the decision and receiving the further user interface input that contradicts the decision, that the decision to refrain from initiating one or more of the one or more currently dormant automated assistant functions was incorrect; and
in response to determining that the determination was incorrect:
generating a gradient based on comparing the predicted output to ground truth output that satisfies the threshold, and
transmitting, over a network and to a remote system, the generated gradient without transmitting any of: audio data and the further user interface input,
wherein the remote system utilizes the generated gradient, and additional gradients from additional client devices, to update global weights of a global machine learning model that is a global counterpart of the machine learning model that is stored locally at the client device.

17. The method of claim 16, wherein the machine learning model is a hotword free invocation model, and wherein the sensor data comprises one or more of: one or more images from a camera of the one or more sensor components, proximity sensor data from a proximity sensor of the one or more sensor components, accelerometer data from an accelerometer of the one or more sensor components, magnetometer data from a magnetometer of the one or more sensor components.

18. The method of claim 16, wherein the one or more currently dormant automated assistant functions comprise one or more of:
activation of speech recognition using a speech recognition model stored locally at the client device,
transmission of the audio data to a remote server,
transmission of recognized text, from the speech recognition, to the remote server, or
activation of natural language understanding, of the recognized text, using a natural language understanding model stored locally at the client device.

19. The method of claim 16, wherein the decision is to not trigger the one or more currently dormant automated assistant functions, and wherein determining that the decision was incorrect is based on:
processing the further user interface input, using the machine learning model, to generate an additional predicted output; and
determining, based on the additional predicted output, to trigger the one or more currently dormant automated assistant functions.

20. A client device comprising:
one or more hardware processors; and
memory storing instructions that, when executed by the one or more hardware processors, cause the one or more hardware processors to:
receive, via one or more microphones of the client device, audio data that captures a spoken utterance of a user;
process the audio data using a machine learning model, stored locally at the client device, to generate a predicted output;
make a decision, based on the predicted output failing to satisfy a threshold, to refrain from initiating one or more currently dormant automated assistant functions;
subsequent to making the decision to refrain from initiating the one or more currently dormant automated assistant functions:
receive, via the client device, further user interface input to initiate one or more of the currently dormant automated assistant functions and that contradicts the decision to refrain from initiating one or more of the currently dormant automated assistant functions; and
determine, based on a duration of time between receiving the audio data that was processed in making the decision and receiving the further user interface input that contradicts the decision, that the decision to refrain from initiating one or more of the one or more currently dormant automated assistant functions was incorrect; and in response to determining that the decision was incorrect:
   generate a gradient based on comparing the predicted output to ground truth output that satisfies the threshold, and
   transmit, over a network and to a remote system, the generated gradient without transmitting any of: the audio data and the further user interface input, wherein the remote system utilizes the generated gradient, and additional gradients from additional client devices, to update global weights of a global machine learning model that is a global counterpart of the machine learning model that is stored locally at the client device.

* * * * *